(12) United States Patent
Mizutani et al.

(10) Patent No.: US 11,277,749 B2
(45) Date of Patent: Mar. 15, 2022

(54) COMMUNICATION DEVICE AND COMMUNICATION SYSTEM

(71) Applicant: KYOTO UNIVERSITY, Kyoto (JP)

(72) Inventors: Keiichi Mizutani, Kyoto (JP); Hiroshi Harada, Kyoto (JP); Takeshi Matsumura, Kyoto (JP); Takuya Habara, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 16/958,021

(22) PCT Filed: Dec. 25, 2018

(86) PCT No.: PCT/JP2018/047596
§ 371 (c)(1),
(2) Date: Jun. 25, 2020

(87) PCT Pub. No.: WO2019/131645
PCT Pub. Date: Jul. 4, 2019

(65) Prior Publication Data
US 2021/0067973 A1 Mar. 4, 2021

(30) Foreign Application Priority Data
Dec. 26, 2017 (JP) .............................. JP2017-249829

(51) Int. Cl.
*H04W 40/22* (2009.01)
*H04W 16/10* (2009.01)
(Continued)

(52) U.S. Cl.
CPC ........... *H04W 16/10* (2013.01); *H04W 40/22* (2013.01); *H04W 84/04* (2013.01); *H04W 88/04* (2013.01)

(58) Field of Classification Search
CPC ..... H04W 16/01; H04W 40/22; H04W 84/04; H04W 28/08; H04W 28/0808; H04W 16/32; H04W 84/18; H04W 88/04
(Continued)

(56) References Cited

U.S. PATENT DOCUMENTS 9,420,564 B2 * 8/2016 Charbit ............... H04W 56/002
9,823,626 B2 11/2017 Zornio et al.
(Continued)

FOREIGN PATENT DOCUMENTS

| JP | 2003-143644 A | 5/2003 |
| JP | 2014-36283 A | 2/2014 |
| JP | 2016-76217 A | 5/2016 |

OTHER PUBLICATIONS

International Search Report dated Mar. 19, 2019 in PCT/JP2018/047596 filed on Dec. 25, 2018, 1 page.

*Primary Examiner* — Danh C Le
(74) *Attorney, Agent, or Firm* — Oblon, McClelland, Maier & Neustadt, L.L.P.

(57) ABSTRACT

Provided is a communication device in which: a wireless network is formed of at least one sub-tree including a sub-root station; the sub-root station collects request wireless resource allocation information which a child station included in the sub-tree has; request wireless resource allocation information of the sub-root station itself is added to the collected request wireless resource allocation information, and the resultant information is reported to a parent station, the parent station notifies the sub-root station of wireless resource information available in the entire sub-tree; and the sub-root station allocates wireless resources to the sub-root station itself and the child station based on the wireless resource information notification.

20 Claims, 43 Drawing Sheets

(51) Int. Cl.
 *H04W 84/04* (2009.01)
 *H04W 88/04* (2009.01)
(58) Field of Classification Search
 USPC .......................... 370/328, 310.2; 455/422.1
 See application file for complete search history.

(56) References Cited

U.S. PATENT DOCUMENTS

| | | | | |
|---|---|---|---|---|
| 10,231,257 B2* | 3/2019 | Huang | ............... | H04W 72/1278 |
| 2003/0169697 A1 | 9/2003 | Suzuki et al. | | |
| 2004/0166853 A1* | 8/2004 | Takeda | .................. | H04W 68/00 |
| | | | | 455/434 |
| 2004/0171382 A1* | 9/2004 | Mittal | .................. | H04W 8/245 |
| | | | | 455/432.3 |
| 2010/0072372 A1* | 3/2010 | Chang | .................. | A63F 13/213 |
| | | | | 250/349 |
| 2011/0282989 A1* | 11/2011 | Geirhofer | ............. | H04W 8/005 |
| | | | | 709/224 |
| 2012/0252509 A1* | 10/2012 | Wen | ..................... | H04B 7/2606 |
| | | | | 455/500 |
| 2013/0016735 A1* | 1/2013 | De Campos Cartolomeu | ............. | |
| | | | | H04L 12/413 |
| | | | | 370/458 |
| 2013/0034096 A1* | 2/2013 | Hu | ........................ | H04L 45/748 |
| | | | | 370/389 |
| 2013/0275480 A1* | 10/2013 | Dhuse | ................. | G06F 16/2272 |
| | | | | 707/829 |
| 2014/0029610 A1* | 1/2014 | Vasseur | ................. | H04L 45/025 |
| | | | | 370/389 |
| 2015/0043671 A1* | 2/2015 | Kim | ....................... | H04B 7/026 |
| | | | | 375/267 |
| 2015/0111596 A1* | 4/2015 | Ruuska | ............... | H04L 27/0006 |
| | | | | 455/454 |
| 2016/0021668 A1* | 1/2016 | Hirai | ..................... | H04W 24/08 |
| | | | | 370/252 |
| 2017/0091992 A1* | 3/2017 | Rogers | .................. | G06T 17/005 |
| 2017/0303175 A1* | 10/2017 | Chen | ................. | H04W 36/0088 |
| 2018/0239774 A1* | 8/2018 | Hu | ........................ | G06F 16/17 |
| 2020/0099476 A1* | 3/2020 | Park | ......................... | H04W 4/70 |
| 2020/0296001 A1* | 9/2020 | She | ........................ | H04L 45/02 |
| 2021/0045034 A1* | 2/2021 | Thubert | ................. | H04W 76/40 |
| 2021/0289453 A1* | 9/2021 | Thubert | ................. | H04W 24/02 |

* cited by examiner

COMMUNICATION DEVICE AND COMMUNICATION SYSTEM

CROSS-REFERENCE TO RELATED APPLICATIONS

The present application is a 35 U.S.C. § 371 national stage patent application of International patent application PCT/JP2018/047596, filed on Dec. 25, 2018, which is based on and claims the benefits of priority to Japanese Application No. 2017-249829, filed on Dec. 26, 2017. The entire contents of these applications are incorporated herein by reference.

TECHNICAL FIELD

The present invention relates to a communication device and a communication system which are suitable for, for example, collecting big data.

TECHNICAL BACKGROUND

In recent years, construction of a system that creates new value by accommodating all kinds of things with wireless communications and by collecting and analyzing a large amount of information (i.e., big data) is progressing. One of the most important problems in this system is how to construct a wireless network that collects information with wide coverage (here, we call this network as "wide-area information collection network"). When it is possible to use commercial wireless or wired communication networks such as LTE (Long Term Evolution) these systems are one of the candidates to construct the wide-area information collection network. However, from aspects of cost, security, and required communication traffic amount, it may be difficult to use such commercial wireless or wired communication networks. Or, when the operation area of the wide-area information collection network is outside of the coverage of these commercial wireless or wired communication networks, we cannot use them. In this case, it is necessary to construct a wireless network that can cover a wide area as private wireless network. However, since an area that can be covered by one wireless device is limited, it is necessary to construct a wireless multi-hop relay network that uses multiple wireless terminals and wireless base stations. For example, Patent Document I describes a technique related to big data analysis.

RELATED ART

Patent Document

Patent Document 1: Japanese Patent Application Laid-Open Publication No. 2016-076217.

SUMMARY OF THE INVENTION

Problems to be Solved by the Invention

In a large-scale wireless relay network that collects big data, a required communication traffic generated at each terminal (i.e., each base station or each relay station) changes every moment, and a problem is how much wireless resource (e.g., bandwidth, number of communication frames) should be allocated to each relay link.

Further, when a large-scale wireless relay network is constructed, it is also a problem to determine multi-hop relaying routes. In the conventional situation, when a power switch of a terminal or a base station is turned on, the terminal or the base station starts to join a network. Therefore, the multi-hop relaying route is determined by the order of the switch on of the terminals or the base stations. As a result, this routing is not an optimal, and this is a problem. Further, when there is a limit on the number of relay stations that a base station can communicate with, some stations may not be able to join the network.

Therefore, a purpose of the present invention is to provide a communication device and a communication system that enable optimal allocation of wireless resources and optimal wireless multi-hop relaying routes to construct a large-scale wireless relay network.

Means for Solving the Problems

The present invention provides a communication device in which: a wireless network is formed of at least one sub-tree including a sub-root station; the sub-root station collects information about requested wireless resource allocation which a child station included in the sub-tree has, and receives information obtained by adding information about requested wireless resource allocation of the sub-root station itself to the collected information about requested wireless resource allocation; and the sub-root station is notified of wireless resource information available in the entire sub-tree.

Further, the present invention provides a communication system that performs such processing.

The present invention provides a communication device that, based on wireless resource information which a sub-root station is notified of, allocates wireless resources to the sub-root station itself and to a child station.

Further, the present invention provides a communication system that performs such processing.

The present invention provides a communication device in which a required wireless resource amount for unit data transmission between connectable stations is calculated, a required E2E (End-to-End) wireless resource amount between a collection base station and each relay station is calculated, and a route for which a determined wireless resource amount is the smallest is selected.

Further, the present invention provides a communication system that performs such processing.

Effect of Invention

According to at least one embodiment, flexible wireless resource allocation can be performed according to an ever-changing communication request amount of each terminal (or base station or relay station). Further, based on information about each terminal (or base station, or relay station) collected by a server that manages the network, or information about communication quality or the like between links, it is possible to determine which terminals (or base stations, or relay stations) should be connected so that an efficient wireless relay network can be constructed, and it is possible to automatically generate a relay route. Further, by repeatedly performing wireless resource allocation according to the present invention and route selection according to the present invention, it is possible to flexibly respond to ever-changing communication conditions and communication request amounts of terminals (or base stations or relay stations) forming the network, and to realize an optimal wireless relay network condition. The effects described here are not necessarily limited, and may be any effects described in the present invention or effects different from them. Further, the content of the present invention is not to be interpreted in a limited manner by effects exemplified in the following description.

MODE FOR CARRYING OUT THE INVENTION

An embodiment described below is a preferred specific example of the present invention, and has various technically preferable limitations. However, the scope of the present invention is not to be limited to the embodiment unless specifically stated in the following description that the present invention is to be limited.

Description of the present invention is presented in the following order.

<1. An Embodiment of the Present Invention>
<2. Modified Embodiments>

1. An Embodiment of the Present Invention

Figure 1:
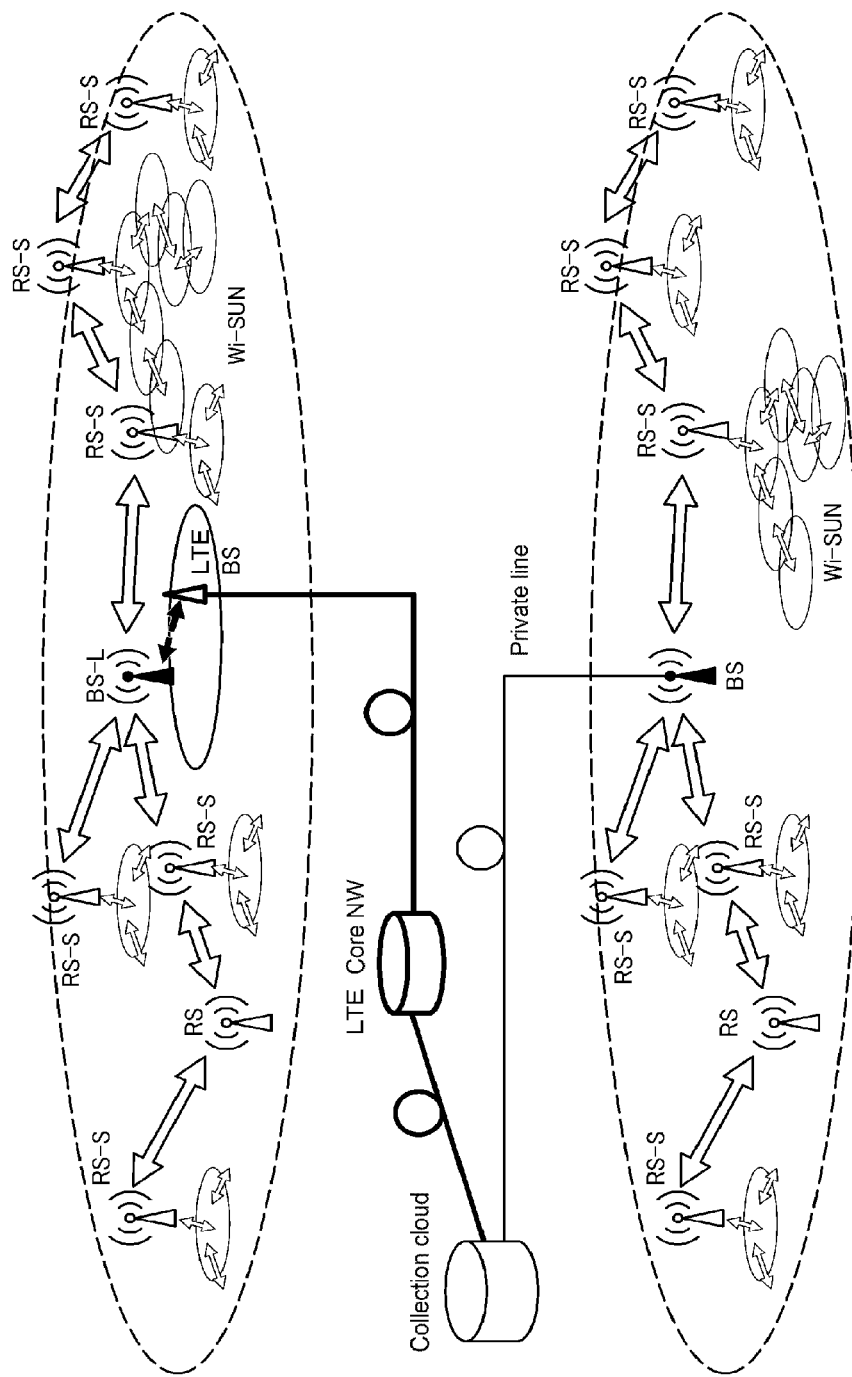
FIG. 1 is a schematic diagram illustrating an outline of a wide-area Wi-RAN to which the present invention can be applied.

In the following, with reference to the drawings, an embodiment of a communication device and a communication system is described. FIG. 1 illustrates, for example, a wide-area wireless communication system (referred to as a wide-area Wi-RAN (Wireless Regional Area Network) as appropriate). An example of type classification and functions of constituent terminals are as shown in Table 1. A wide-area Wi-RAN system is expected to operate in a VHF band and a UHF band in order to increase a communication distance between hops. The present invention is applied to communication using a backbone line in such a Wi-RAN.

TABLE 1

| Terminal type | Abbreviation | Function |
|---|---|---|
| Collection base station | BS | A root terminal of a wide-area Wi-RAN connectable to cloud through a private wireless or wired network. |
| Collection base station (with Wi-SUN base station function) | BS-S | A root terminal of a wide-area Wi-RAN also has a Wi-SUN base station function. The Wi-SUN network and Wi-RAN network can be bridged by the BS-S. |
| Collection base station (with LTE base station function) | BS-L | A root terminal of a wide-area Wi-RAN connectable to an LTE base station (router) or also has an LTE base station function (bridge), connectable to cloud through LTE |
| Collection base station (with Wi-SUN base station function and LTE base station function) | BS-LS | A root terminal of a wide-area Wi-RAN also has a Wi-SUN base station function like BS-S. Furthermore, BS-LS also has the function of BS-L. |
| Relay station | RS | A relay terminal of a wide-area Wi-RAN. |
| Relay station (with Wi-SUN base station function) | RS-S | A relay terminal of a wide-area Wi-RAN also has a Wi-SUN side base station function (bridge). |

In Table 1, Wi-SUN (registered trademark) is a wireless communication standard that uses a specific power-saving wireless or a wireless frequency band called Sub-GHz (sub-GHz). In Japan, it corresponds to a 920 MHz band.

Further, an outline of this wide-area Wi-RAN is illustrated below.

It has a tree topology structure.

Downstream (denoted as DS): Multiple accesses from one collection base station (BS, BS-S, BS-L, or BS-LS) to multiple relay stations (RS, or RS-S)

Downlink (DL): Communication between stations in a downlink direction

Upstream (denoted as US): Multiple access of multiple relay stations to an upper relay station, and final destination is only one or multiple collection base stations Uplink (UL): Communication between stations in an uplink direction BS is a root station of a wide-area Wi-RAN and is a wireless device that can connect to the Internet or a cloud through a private line.

BS-S is a root station of a wide-area Wi-RAN, is a wireless device that can connect to the Internet or a cloud through a private communication network, and, further, is a wireless device that has a bridge function with a local data collection network such as Wi-SUN or a collection base station function of a local data collection network such as a Wi-SUN.

BS-L is a root station of a wide-area Wi-RAN and is a wireless device that can connect to the Internet or a cloud through a commercial LTE network or a private network.

BS-LS is a root station of a wide-area Wi-RAN, is a wireless device that can connect to the Internet or a cloud through a commercial LTE network or a private network, and, further, is a wireless device that has a bridge function with a local data collection network such as Wi-SUN or a collection base station function of a local data collection network such as a Wi-SUN.

RS is a wireless device with a Wi-RAN relay function.

RS-S is a wireless device that has a Wi-RAN relay function, and further, is a wireless device that has a bridge function with a local data collection network such as a Wi-SUN or a collection base station function of a local data collection network such as a Wi-SUN.

Figure 2:
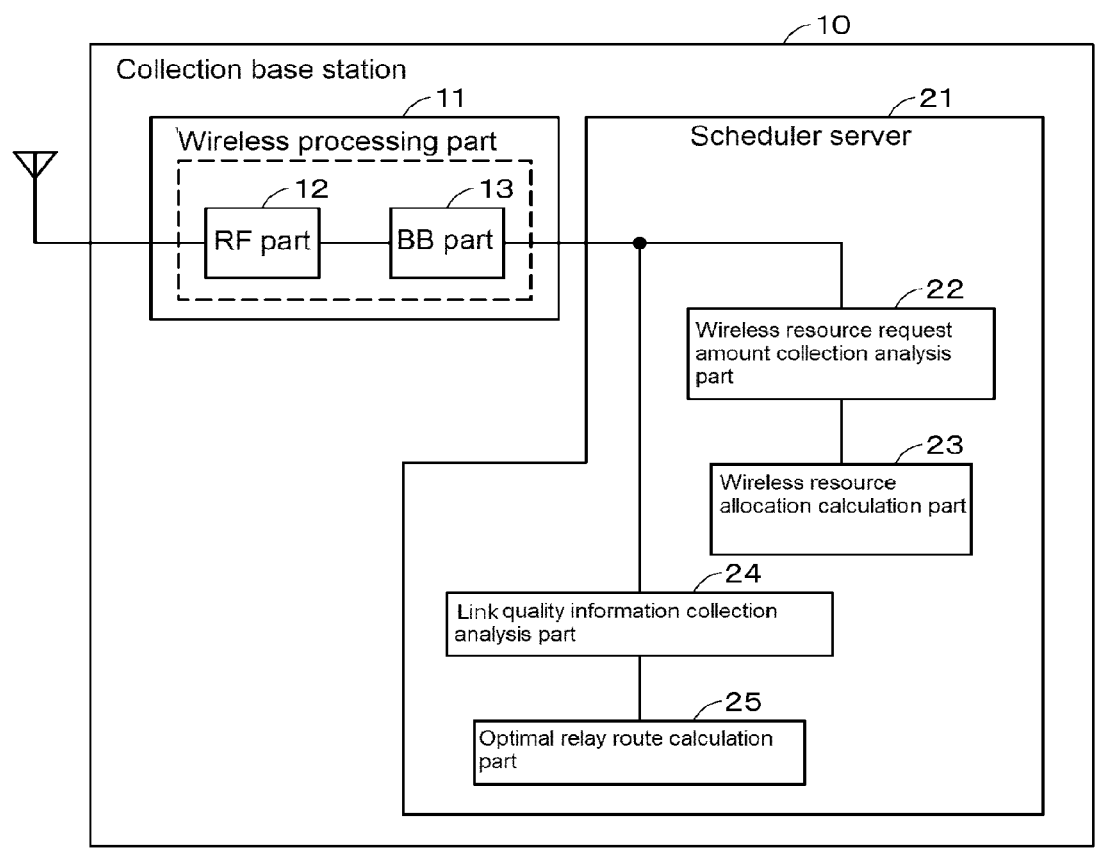
FIG. 2 is a block diagram illustrating a schematic structure of a collection base station.

FIG. 2 illustrates a schematic structure of a collection base station (a collection base station BS, a collection base station BS-L, or the like in FIG. 1). A collection base station 10 has a wireless processing part 11 and a scheduler server 21. The wireless processing part 11 includes a high frequency processing part 12 and a baseband processing part 13 for wireless communication. The scheduler server 21 is provided for the wireless processing part 11. Control of wireless resource allocation and control of route selection are performed by the scheduler server 21. The control of wireless resource allocation is performed by a wireless resource request amount collection analysis part 22 and a wireless resource allocation calculation part 23. The control of route selection is performed by a line quality information collection analysis part 24 and an optimal relay route calculation part 25 which are related to relay stations and relay links. In the present specification, a wireless resource means a network wireless resource.

Figure 3:
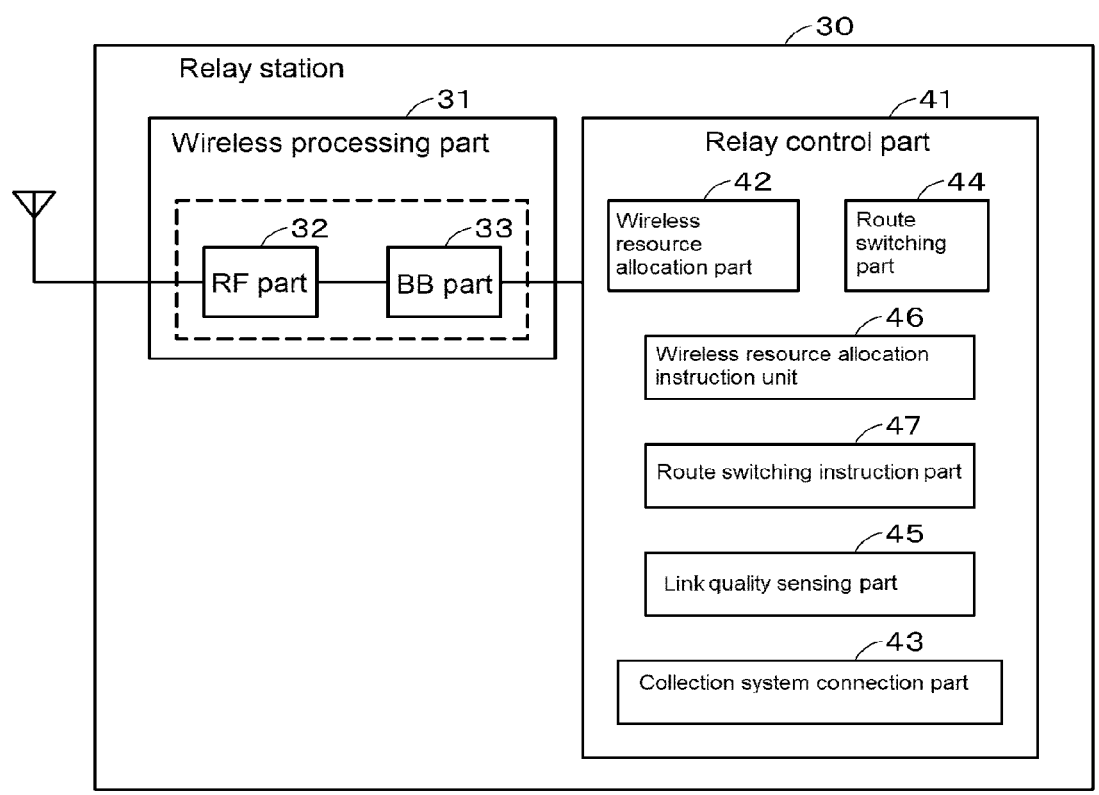
FIG. 3 is a block diagram illustrating a schematic structure of a relay station.

FIG. 3 illustrates a schematic structure of a relay station (a relay station RS, a relay station RS-S, or the like in FIG. 1). A relay station 30 has a wireless processing part 31 and a relay control part 41. The wireless processing part 31 includes a high frequency processing part 32 and a baseband processing part 33 for wireless communication. The relay control part 41 is provided for the wireless processing part 31. Control of wireless resource allocation and control of route selection are performed by the relay control part 41. A wireless resource allocation part 42 and a collection system connection part 43 are provided for the control of wireless resource allocation.

A route switching part 44, a line quality sensing part 45, a wireless resource allocation instruction part 46 and a route switching instruction part 47 are provided for the control of route selection.

"Outline of Wireless Resource Allocation Processing"

Figure 4:
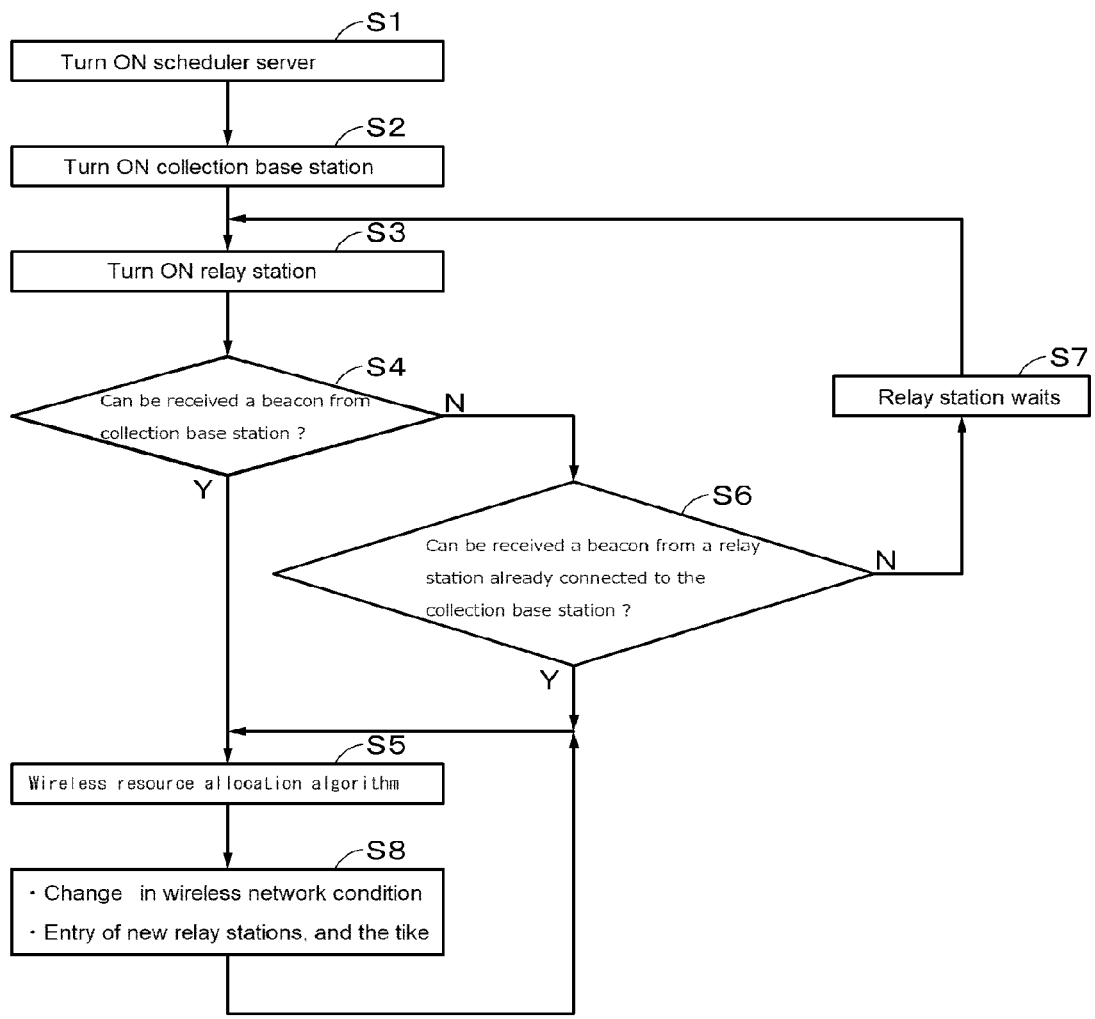
FIG. 4 is a flowchart illustrating an overall flow of processing.

FIG. 4 is a flowchart illustrating an overall flow of wireless resource allocation processing in the embodiment of the present invention, and the following processing is performed.

Step S1: Power of a scheduler server is turned ON.
Step S2: Power of a collection base station is turned ON.
Step S3: Power of a relay station is turned ON.
Step S4: Whether or not a beacon from the collection base station can be received is determined.
Step S5: When it is determined that a beacon can be received, wireless resource allocation algorithm processing is performed.
Step S6: When it is determined in Step S4 that a beacon cannot be received, whether or not a beacon from the relay station which is already connected to the collection base station can be received.
Step S7: When it is determined in Step S6 that a beacon cannot be received, the relay station waits.
Step S8: Occurrence of a change in wireless network condition, an entry of a new relay station or the like is detected. In this case, the processing returns to Step S5 (wireless resource allocation algorithm processing).

"Wireless Resource Allocation"

Figure 5C:
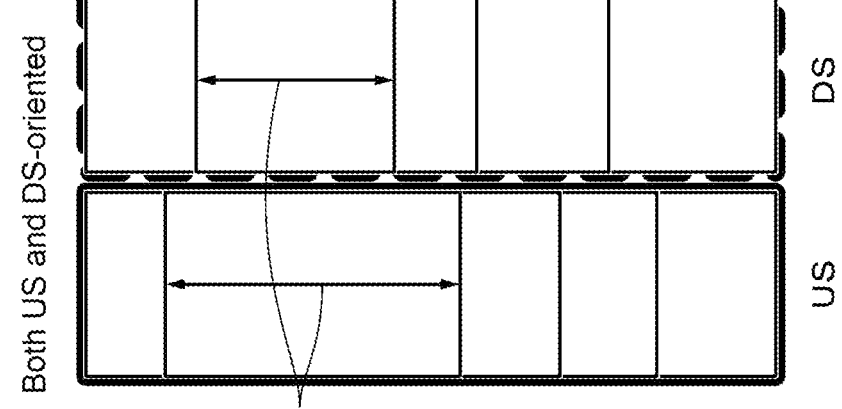
FIGS. 5A, 5B and 5C are schematic diagrams used in describing types of wireless resource allocation.
Figure 5B:
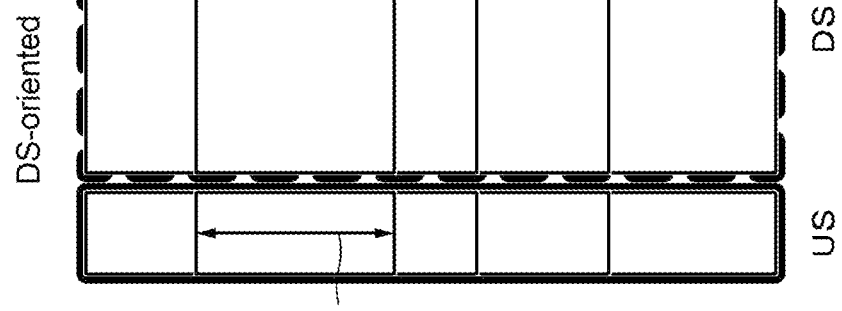
Figure 5A:
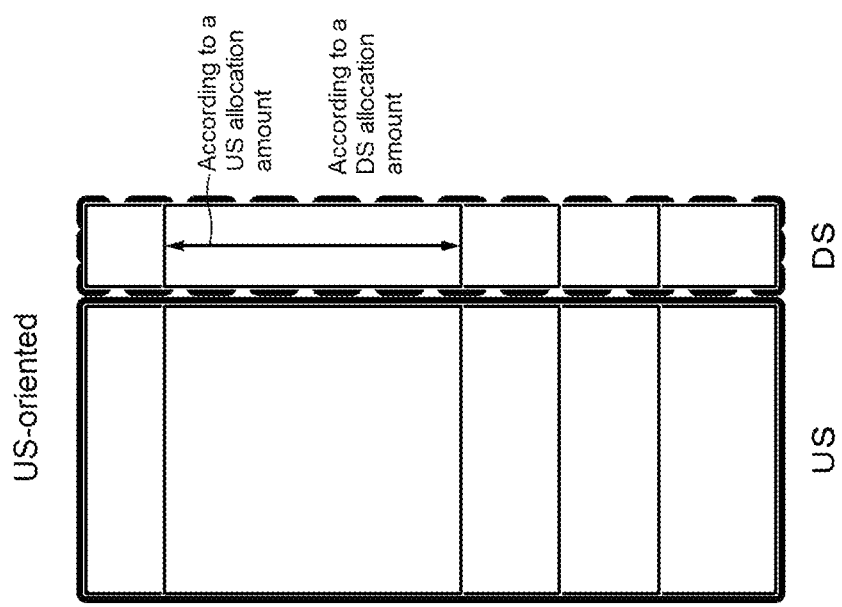

In wireless resource allocation, a US (Up Stream) to DS (Down Stream) ratio is variable depending on a system used. FIG. 5A illustrates a US-oriented wireless resource allocation. It is suitable for a system with a large US request amount. A DS allocation amount is determined according to a US allocation amount. FIG. 5B illustrates a DS-oriented wireless resource allocation. It is suitable for a system with a large DS request amount. A US allocation amount is determined according to a DS allocation amount. FIG. 5C illustrates a both US and DS-oriented wireless resource allocation. It is suitable for a system in which a US request amount and DS request amount are about the same. A DS allocation amount and a US allocation amount are separately determined. As an example, wireless resources include a frequency-related wireless resource, a time-axis-related wireless resource, and the like. In FIG. 5, for example, a vertical axis represents a frequency-related wireless resource, and a horizontal axis represents a time-related wireless resource. A wireless resource allocation amount is represented by an area of a rectangular region. In a VHF band or a UHF band, there is also a problem of a relative bandwidth, and since an allocated channel bandwidth is relatively small at about 5 MHz or 6 MHz, and since the number of wireless resource allocation divisions in a frequency direction may be limited, in this case, it is more realistic to allocate wireless resources in a time axis direction. On the other hand, when a relatively wide band can be allocated to the entire system, wireless resources may be divided and allocated in the frequency direction. Or, the wireless resources may be divided and allocated in both the frequency direction and the time axis direction.

"Wireless Resource Allocation Processing"

Figure 6:
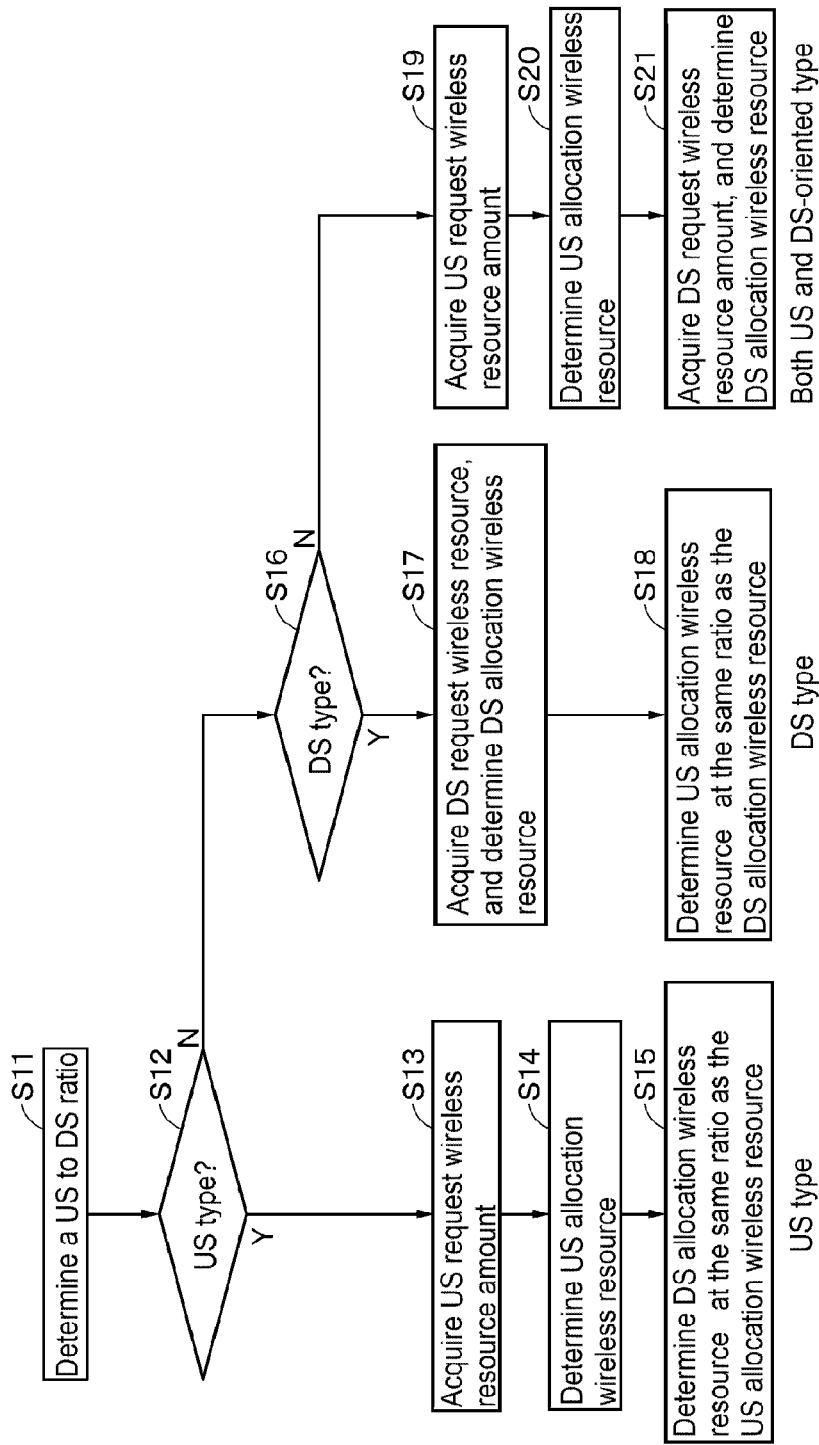
FIG. 6 is a flowchart illustrating a flow of wireless resource allocation processing.

FIG. 6 is a flowchart illustrating an example of a flow of wireless resource allocation processing, and the following processing is performed.

Step S11: A US to DS ratio is determined.

Step S12: Whether or not it is a US type (US-oriented) is determined.

Step S13: When it is determined that it is a US type in Step S12, a US request wireless resource amount is acquired.

Step S14: A US allocation wireless resource is determined.

Step S15: A DS allocation wireless resource is determined at the same ratio as the US allocation wireless resource.

Step S16: When it is determined that it is not a US type in Step S12, whether or not it is a DS type (DS-oriented) is determined.

Step S17: When it is determined that it is a DS type in Step S16, a DS request wireless resource amount is acquired. Further, a DS allocation wireless resource is determined.

Step S18: A US allocation wireless resource is determined at the same ratio as the DS allocation wireless resource.

Step S19: When it is determined that it is not a DS type in Step S16, a US request wireless resource amount is acquired.

Step S20: A US allocation wireless resource is determined.

Step S21: A DS request wireless resource amount is acquired, and a DS allocation wireless resource is determined.

The above processing of the flowchart illustrated in FIG. 6 is periodically repeated.

"Request Wireless Resource Amount Acquisition in US"

Figure 7:
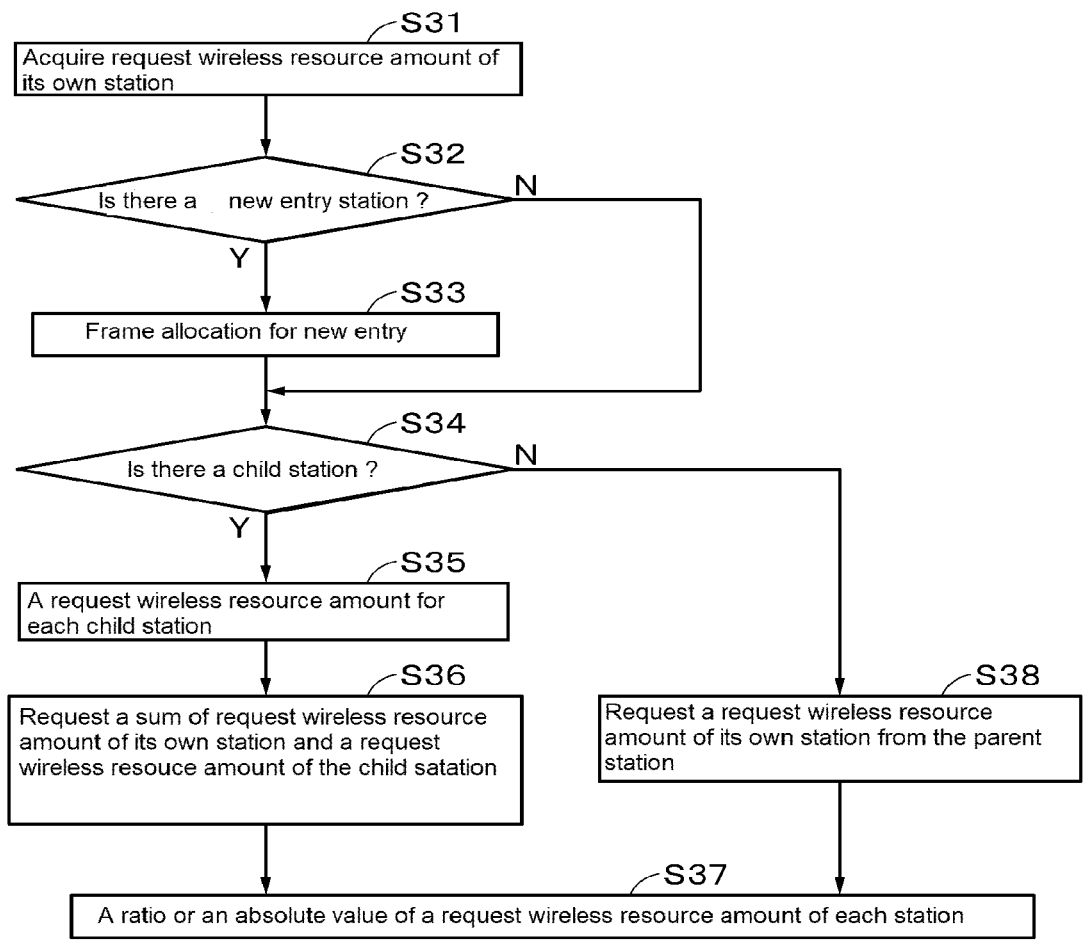
FIG. 7 is a flowchart illustrating a flow of wireless resource allocation processing.
Figure 8:
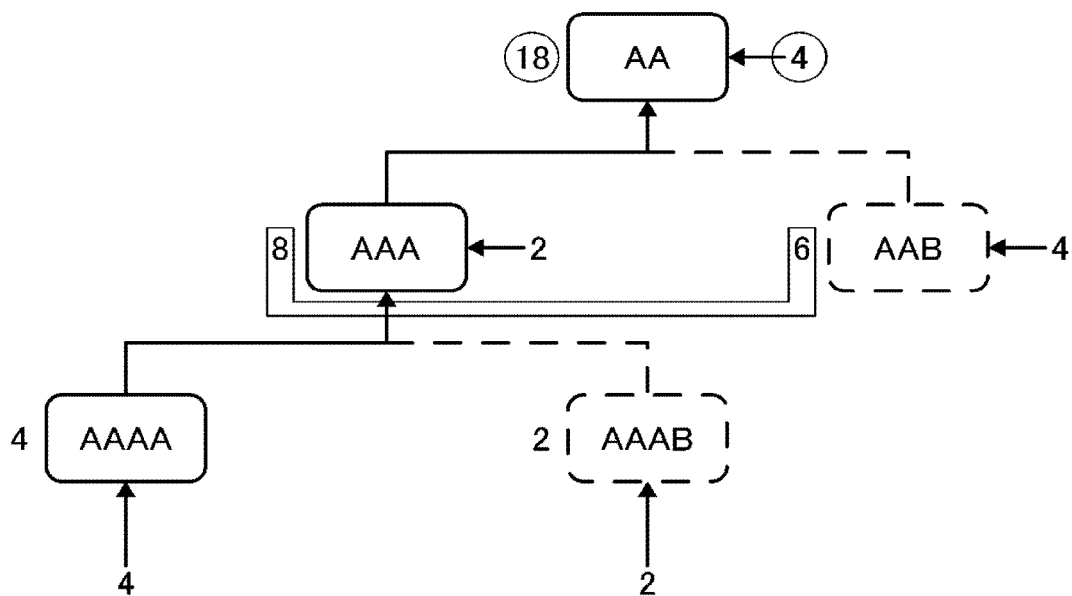
FIG. 8 is a schematic diagram for describing an example of wireless resource allocation processing.

FIG. 7 is a flowchart illustrating an example of a flow of processing of request wireless resource amount acquisition in a US, and the following processing is performed. Further, FIG. 8 illustrates a specific example of a sub-tree when "AA" is a sub-root station. The sub-tree in this specific example is formed of "AA," "AAA," "AAB," "AAAA" and "AAAB."

Step S31: A request wireless resource amount of its own station is acquired.

Step S32: Whether or not there is a new entry station is determined.

Step S33: When it is determined that there is a new entry station in Step S32, new entry frame allocation (arbitrary size) is performed.

Step S34: Whether or not there is a child station is determined.

Step S35: When it is determined that there is a child station in Step S34, a request wireless resource amount for each child station is acquired.

Step S36: Requesting a sum of the request wireless resource amount of its own station and the request wireless resource amount of the child station from a parent station is performed.

Step S37: Ratios or absolute values of the request wireless resource amounts of the stations are saved.

Step S38: When it is determined that there is no child station in Step S34, requesting the request wireless resource amount of its own station from the parent station is performed. Then, the processing proceeds to Step S37.

In FIG. 8, "A" or "B" represents a station ID. When "AA" is a sub-root station, "AAA" and "AAB" are child stations. Since a request wireless resource amount of its own station of "AAA" is "2," and a request wireless resource amount of child stations of "AAA" is "6," "the total value of the request wireless resource amount of its own station and the request wireless resource amount of the child stations is 2+6=8" for "AAA." Regarding "AAB," "total value of a request wireless resource amount of its own station and a request wireless resource amount of a child station is 4+2=6." Therefore, for "AA," "total value of a request wireless resource amount of its own station and a request wireless resource amount of the child stations is 4+8+6=18." Therefore, "AA" requests "18" from a parent station.

"US Allocation Wireless Resource Determination"

Figure 9:
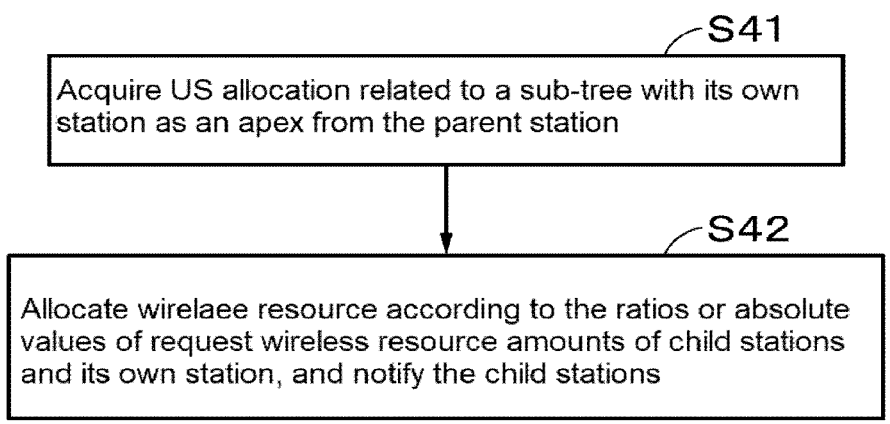
FIG. 9 is a flowchart illustrating a flow of wireless resource allocation processing.
Figure 10:
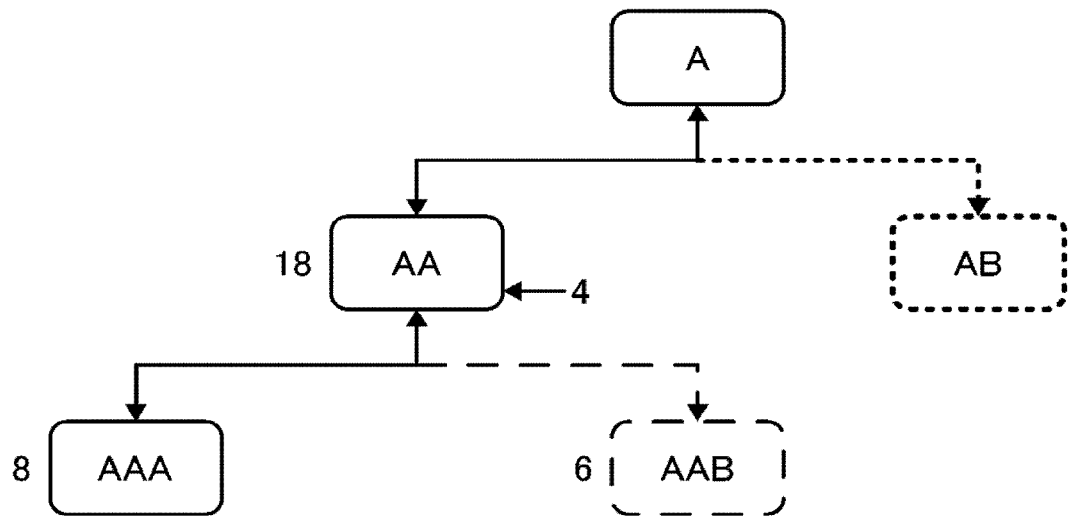
FIG. 10 is a schematic diagram for describing an example of wireless resource allocation processing.

FIG. 9 is a flowchart illustrating an example of a flow of US allocation wireless resource determination processing in wireless resource allocation determination processing, and the following processing is performed. Further, FIG. 10 illustrates a specific example of a sub-tree when "AA" is a sub-root station. The sub-tree is formed of "AA," "AAA" and "AAB."

Step S41: US allocation related to a sub-tree with its own station as an apex is acquired from a parent station. Step S42: Wireless resources are allocated according to ratios or absolute values of request wireless resource amounts of child stations and its own station, and the child stations are notified.

FIG. 10 illustrates an example of a sub-tree when "AA" is a sub-root station. It is assumed 36 wireless resources for US are allocated from "A" (a parent station of AA). The wireless resources allocated from this "A" are allocated at ratios of (4:8:6), that is, 8 wireless resources are allocated to "AA," 16 wireless resources are allocated to "AAA," and 12 wireless resources are allocated to "AAB." The child stations are notified of these allocations. Examples of absolute values are the number of bytes, the number of frames, and the like.

"Processing of DS Request Wireless Resource Amount Acquisition and DS Allocation Wireless Resource Determination"

Figure 11:
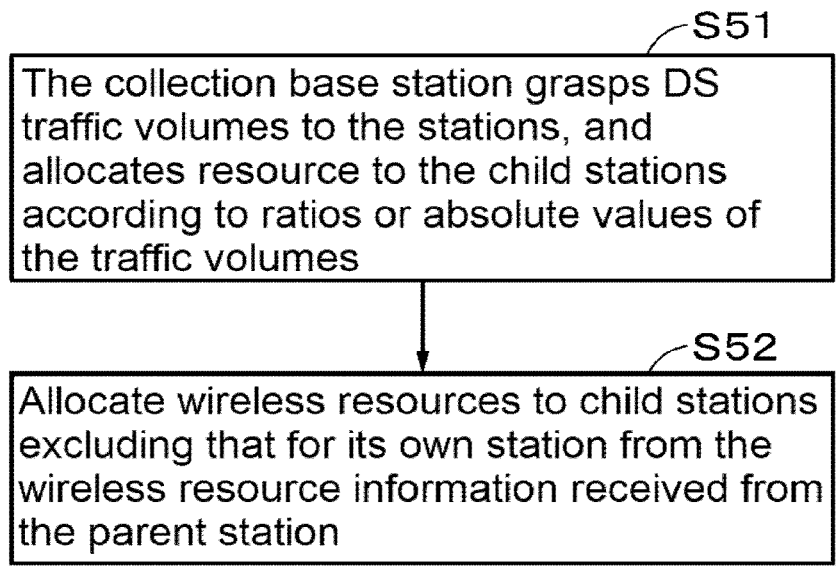
FIG. 11 is a flowchart illustrating a flow of wireless resource allocation processing.

FIG. 11 is a flowchart illustrating an example of a flow of processing of DS request wireless resource amount acquisition and DS allocation wireless resource determination in wireless resource allocation determination processing, and the following processing is performed.

Figure 12:
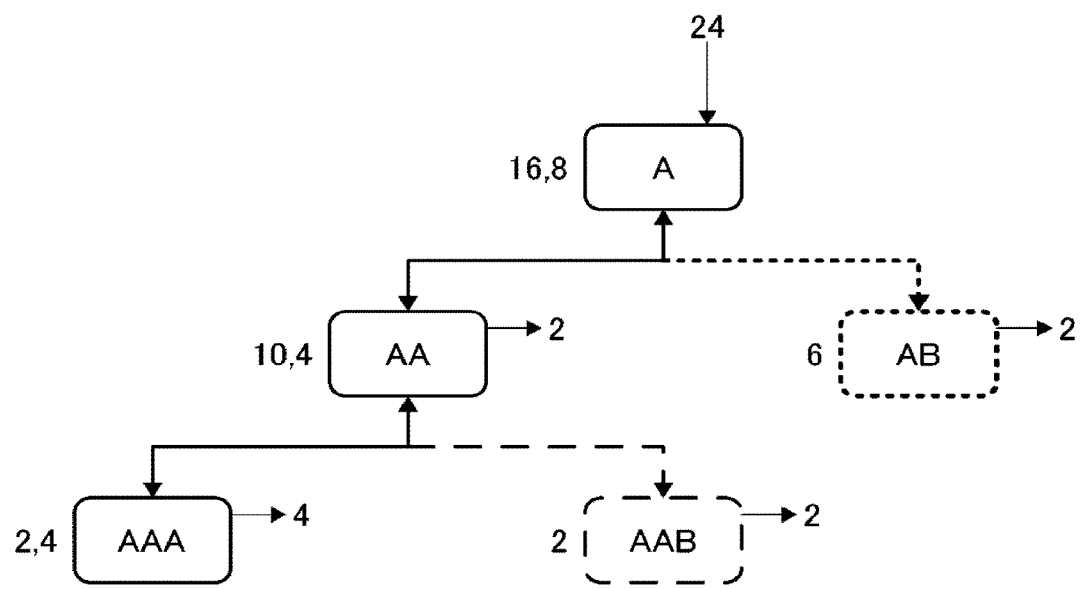
FIG. 12 is a schematic diagram for describing an example of wireless resource allocation processing.

Further, FIG. 12 illustrates a specific example of a sub-tree when "AA" is a sub-root.

Step S51: The collection base station grasps DS traffic volumes to stations, and allocates wireless resources to child stations according to ratios or absolute values of the traffic volumes. The absolute values are the number of bytes, the number of frames, and the like.

Step S52: Wireless resource allocated from a parent station, excluding wireless resource allocated for its own station, is allocated to the child stations.

FIG. 12 illustrates an example of a sub-tree when "AA" is a sub-root station. The sub-tree is formed of "AA," "AAA" and "AAB." "AA" as a sub-root station grasps a traffic volume (for example, 10) of "AAA" as a child station and a traffic volume (for example, 4) of "AAB" as a child station.

"AA" receives that 16 as wireless resources for DS is allocated from "A" (the parent station of AA). "AA" allocates 14, excluding wireless resource (2) allocated to its own station, according to a ratio (10:4) or absolute values of the DS traffic volumes of the child stations.

Figure 13:
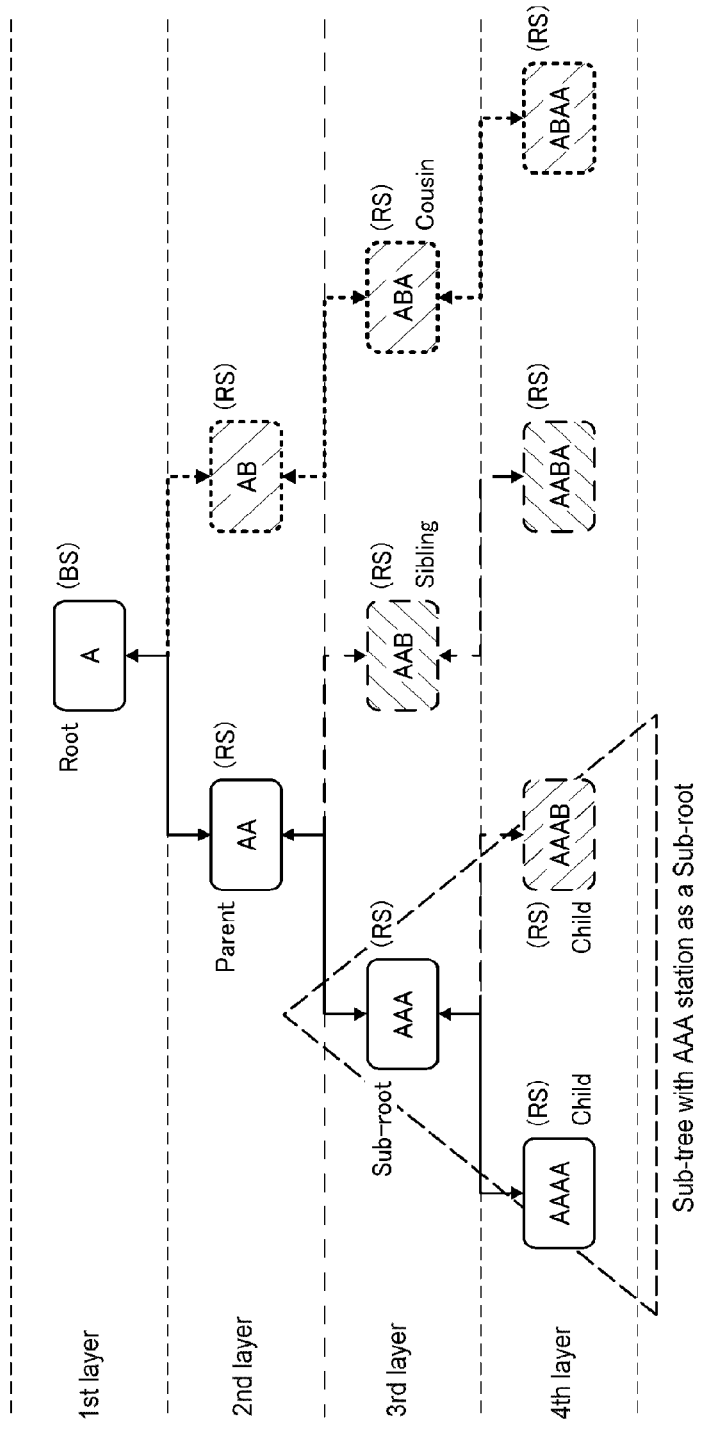
FIG. 13 is a schematic diagram of an example of a wireless network system.

"Description of wireless resource allocation" Wireless resource allocation in an embodiment of the present invention is described below in more detail. Control of wireless resource allocation described below is basically the same as that described above. An example of a wireless network system is illustrated in FIG. 13. The wireless network is called TD/MM (Top-Down and Middle Management) type TDD bidirectional multi-pop.

Figure 14A:
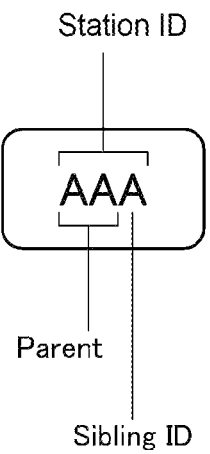
FIG. 14A and FIG. 14B are schematic diagrams for describing IDs added to stations.

As an example, layers from a first layer to a fourth layer are provided. Characters attached to stations respectively represent station IDs. As illustrated in FIG. 14A, for example, the upper "AA" in the "AAA" station ID indicates an ID of a parent station (indicated as Parent in the figure), and the lower "A" indicates an ID of a sibling station (indicated as Sibling in the figure). For example, "AAA" and "AAB" are sibling stations. Further, "ABA" indicates a cousin station (indicated as Cousin in the figure). A sub-tree is represented by a triangular connection with a certain station as an apex. In FIG. 13, a sub-tree with "AAA" as a sub-root station is illustrated.

An outline of a basic operation is described below.

A resource block (a wireless resource allocation unit) is allocated to each link.

A basic operation of each sub-root is as follows.

1. A sub-root station collects request wireless resource allocation information of each layer which each child station has.

2. Request wireless resource allocation information of the sub-root station itself is added to the above collection information, and the resultant information is reported to a parent station.

3. Wireless resource information of each layer that can be used in the entire sub-tree is delivered from the parent station to the sub-root station.

4. The above allocation wireless resources are allocated to the sub-root station itself and the child stations.

A wireless resource request amount of each station itself includes a wireless resource amount for a new entry station.

There are three methods for allocating a wireless resource block.

In the first method, links of the same layer are divided in a frequency direction. Links of different layers are divided in a time direction.

In the second method, links are divided in the time direction only, not in subcarriers (frequency direction).

In the third method, links are divided in the frequency direction and in the time direction.

"Specific Example of Wireless Resource Allocation"

Figure 14B:
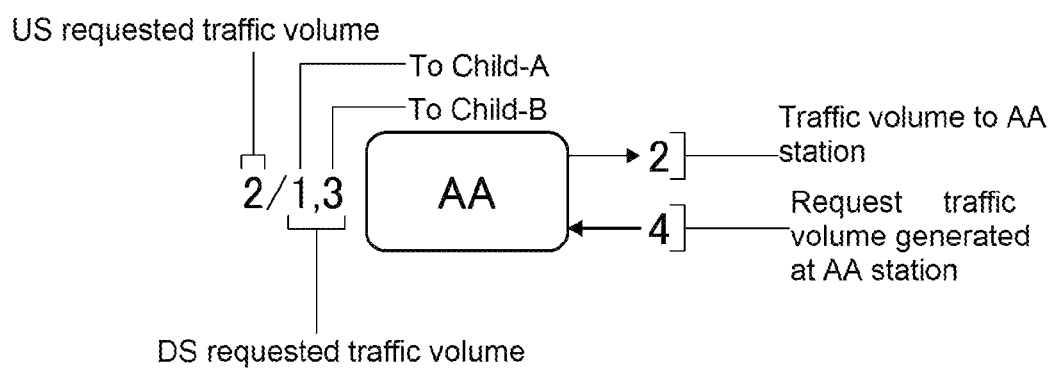
Figure 15:
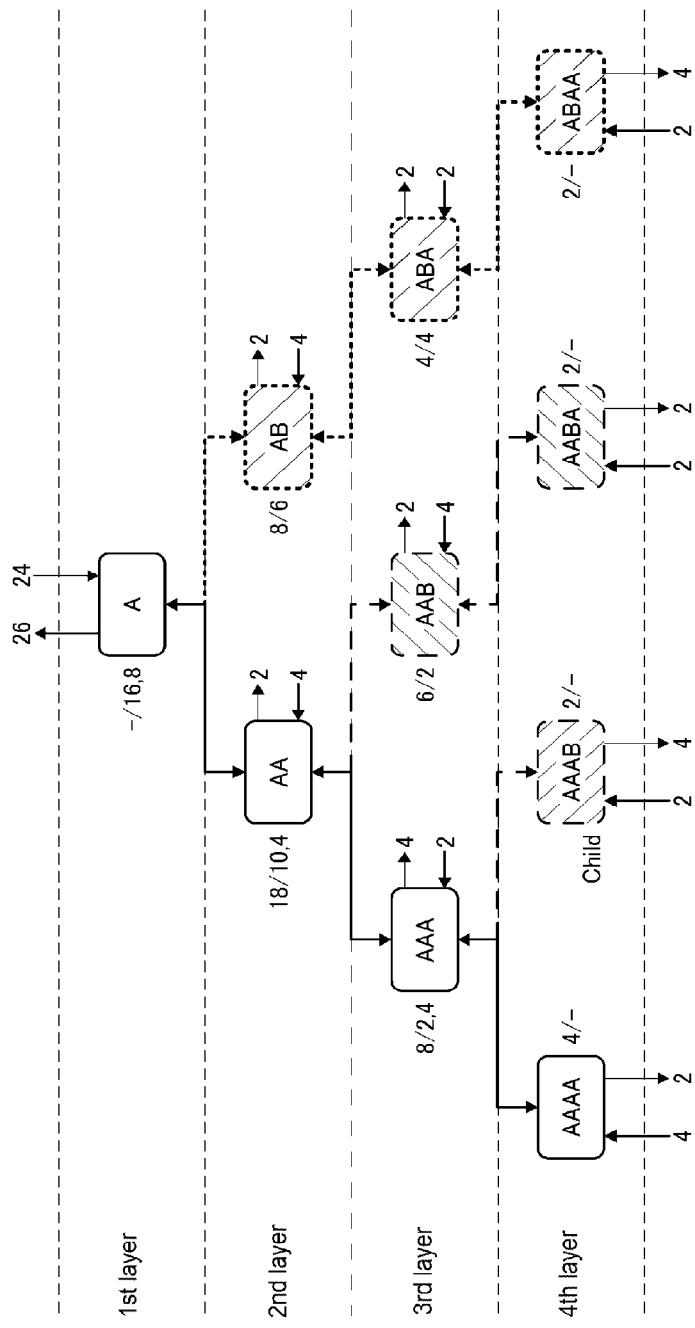
FIG. 15 is a schematic diagram illustrating an example of request traffic volumes of stations.

FIG. 15 illustrates an example of request traffic volumes of the stations in the wireless network system illustrated in FIG. 13. As illustrated in FIG. 14B, for example, of the numbers (2/1, 3) added to the left side of the box of the "AA" station, "2" represents a US request traffic volume, "1" represents a DS request traffic volume to an A station which is a child station (indicated as Child in the figure), and "3" represents a DS request traffic volume to a B station which is a child station. Also, "→2" added to the right side of the box represents a traffic volume to the AA station, and "←4" added to the right side of the box represents a request traffic volume of its own station generated at the AA station.

Figure 16:
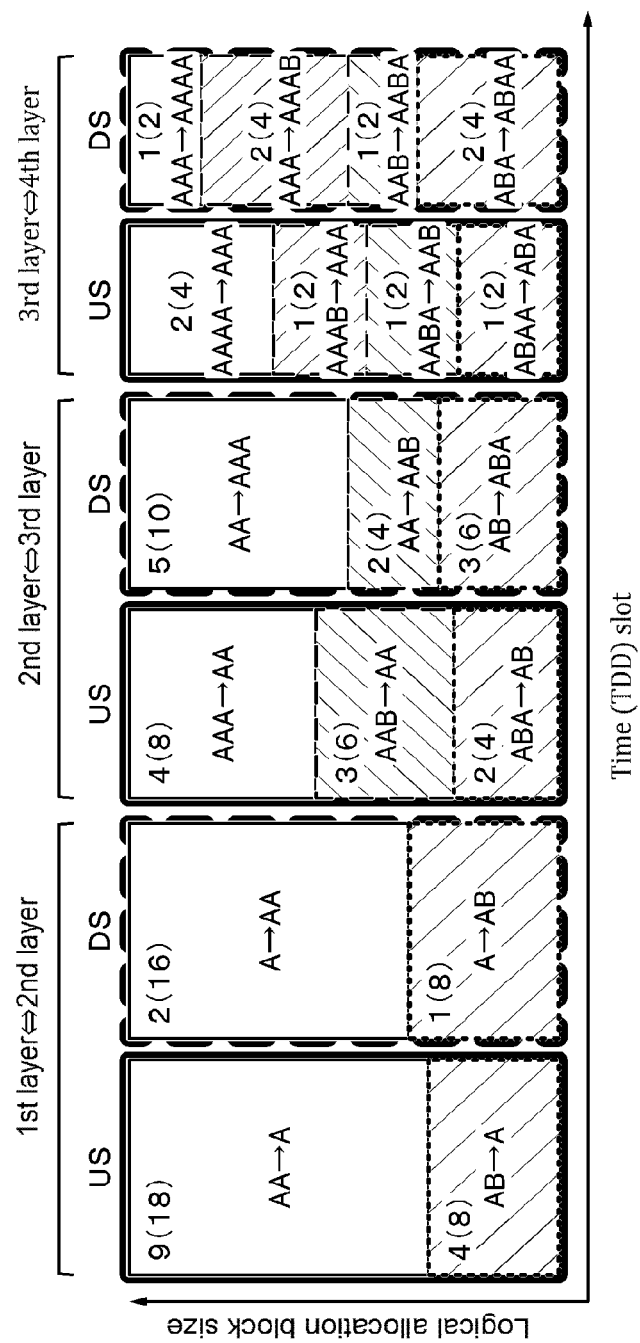
FIG. 16 is a schematic diagram illustrating an example of wireless resource allocation.

FIG. 16 illustrates results of wireless resource allocation corresponding to the example illustrated in FIG. 15. In FIG. 16, a horizontal axis represents time (TDD) slot, and a vertical axis represents logical allocation block size. Further, wireless resource allocation is performed for each of US and DS between stations of different layers. In the following, such wireless resource allocation procedures are described in order.

"US Wireless Resource Allocation Procedure (1-1)"

Figure 17:
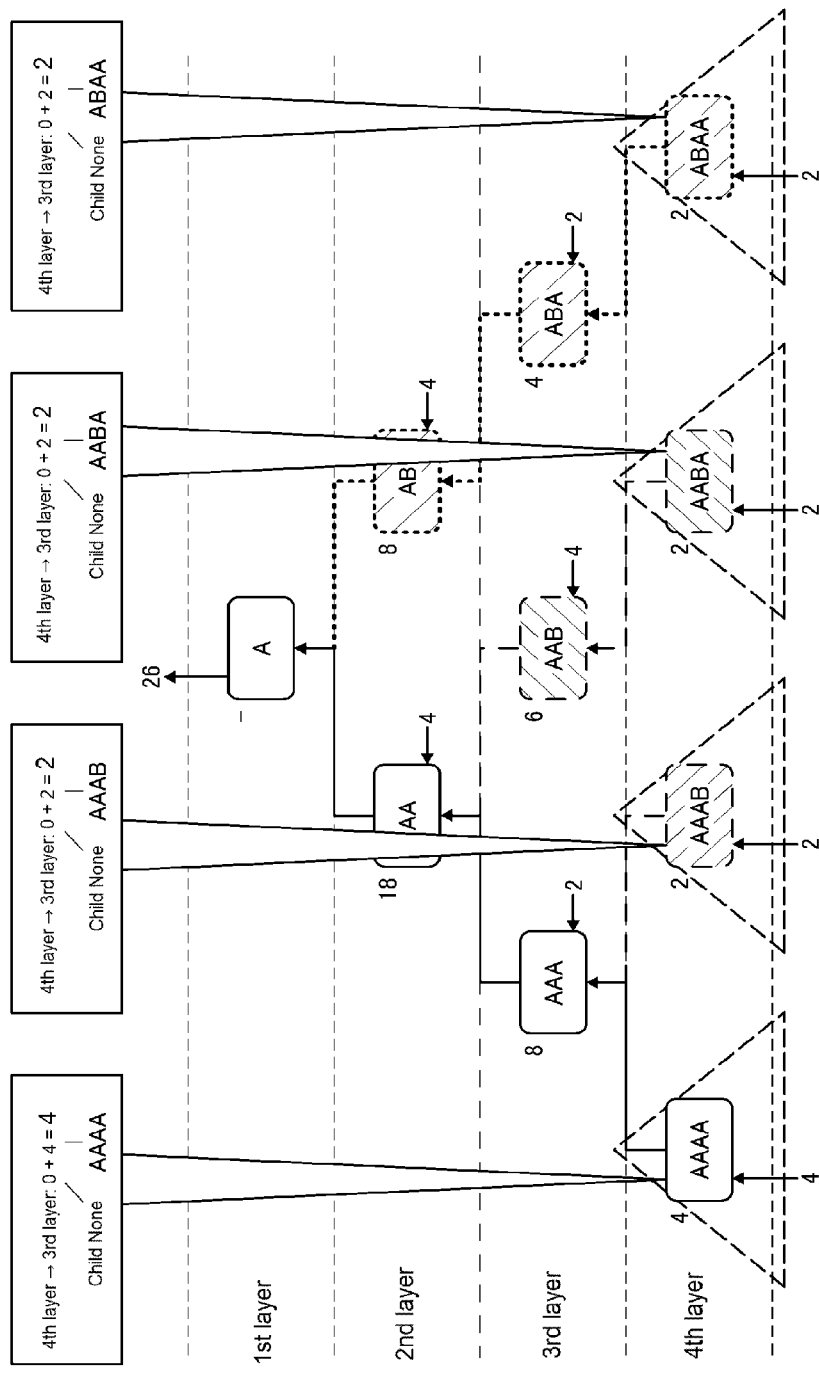
FIG. 17 is a schematic diagram used in describing a US (Up Stream) wireless resource allocation procedure.

Each sub-root station collects a US request traffic volume total amount of layers of its own sub-tree and reports it to a parent station. FIG. 17 illustrates an example in which a sub-root station in the fourth layer collects a US traffic volume total amount of its own sub-tree and reports it to a parent station in the third layer.

"US Wireless Resource Allocation Procedure (1-2)"

Figure 18:
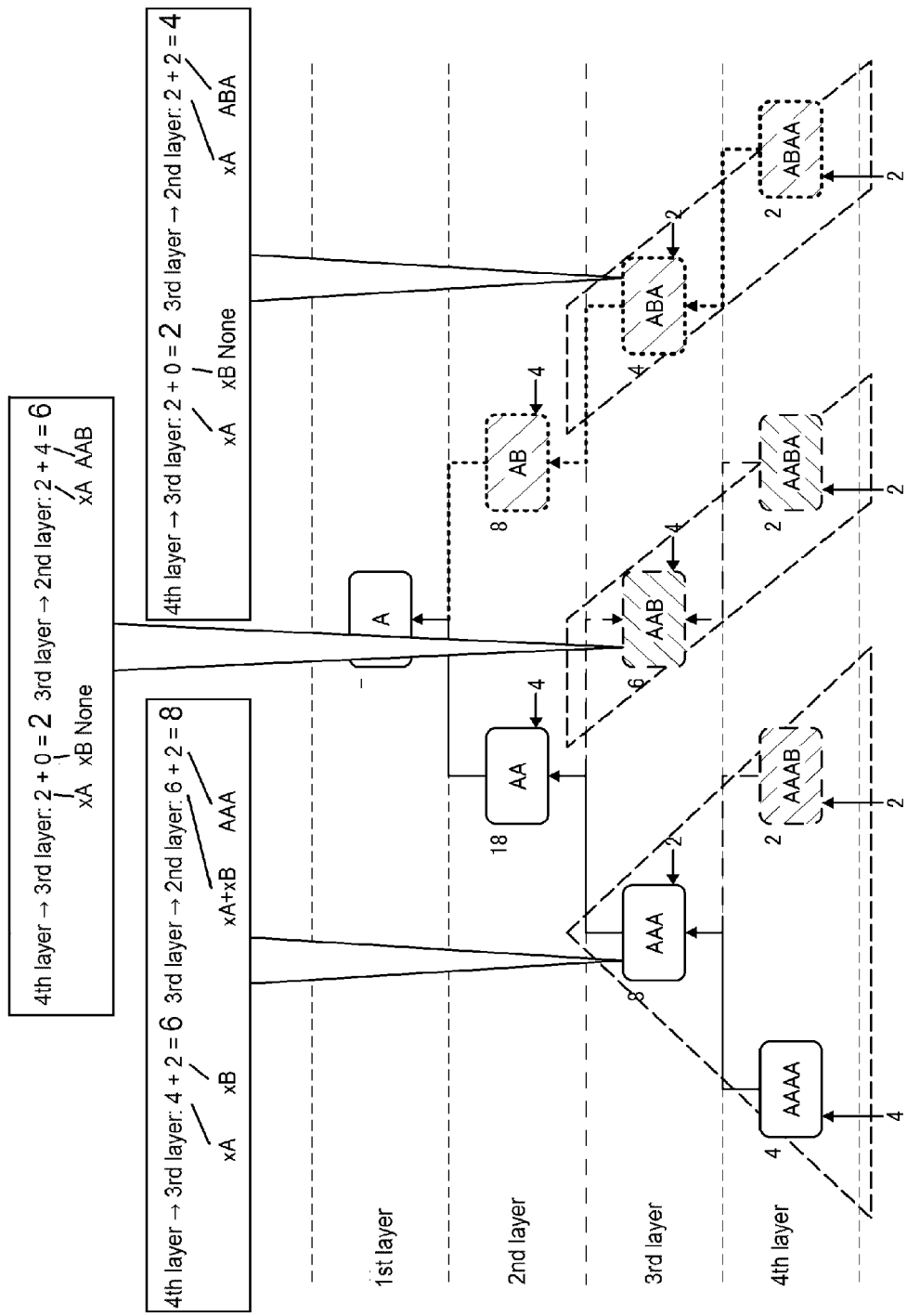
FIG. 18 is a schematic diagram used in describing a US wireless resource allocation procedure.

Each sub-root station collects a US request traffic volume total amount of layers of its own sub-tree and reports it to a parent station. FIG. 18 illustrates an example in which a sub-root station in the third layer collects a US traffic volume total amount of its own sub-tree and reports it to a parent station in the second layer.

"US Wireless Resource Allocation Procedure (1-3)"

Figure 19:
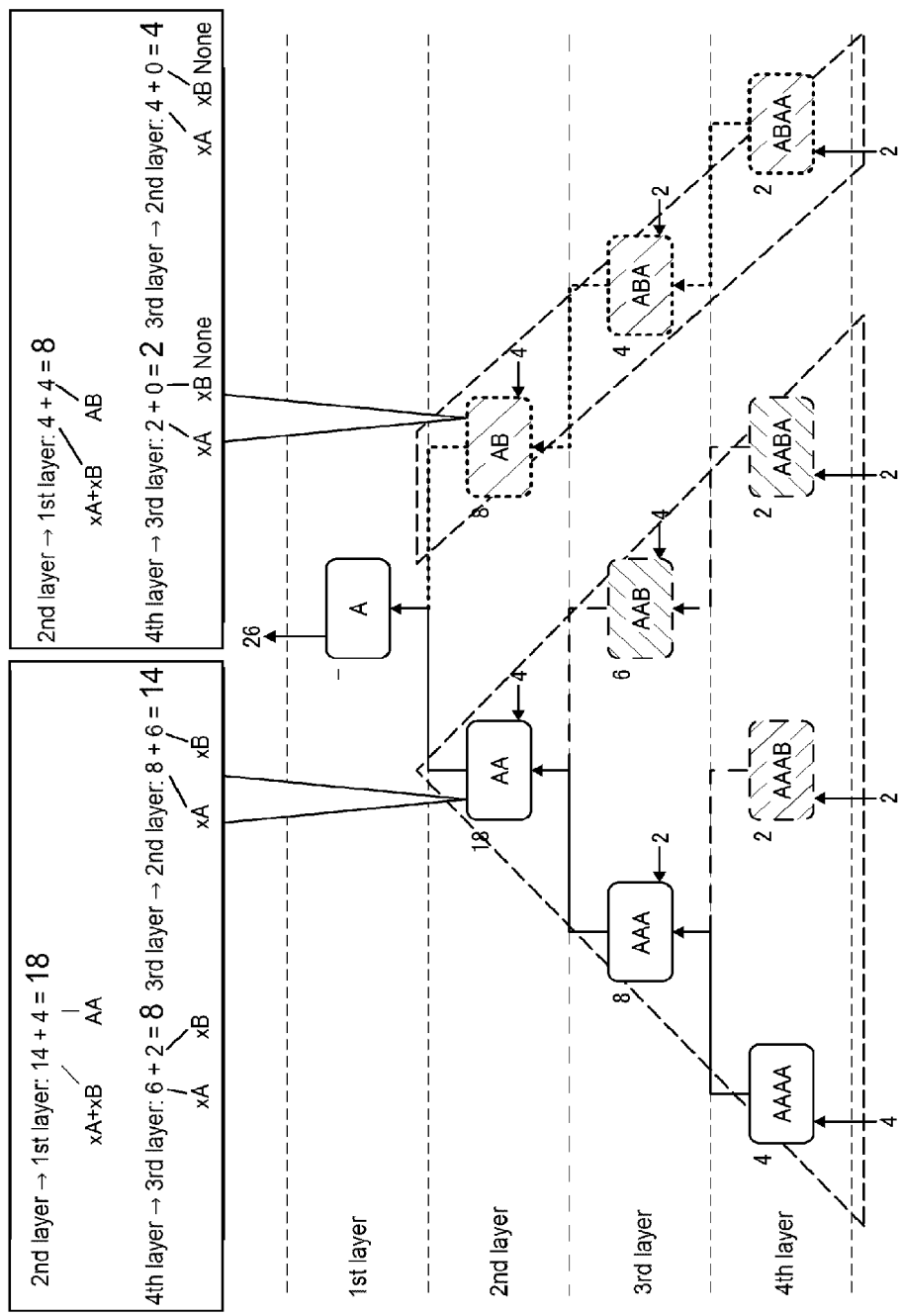
FIG. 19 is a schematic diagram used in describing a US wireless resource allocation procedure.

Each sub-root station collects a US request traffic volume total amount of layers of its own sub-tree and reports it to a parent station. FIG. 19 illustrates an example in which a sub-root station in the second layer collects a US traffic volume total amount of its own sub-tree and reports it to a parent station in the first layer.

"US Wireless Resource Allocation Procedure (2-1)"

Figure 20:
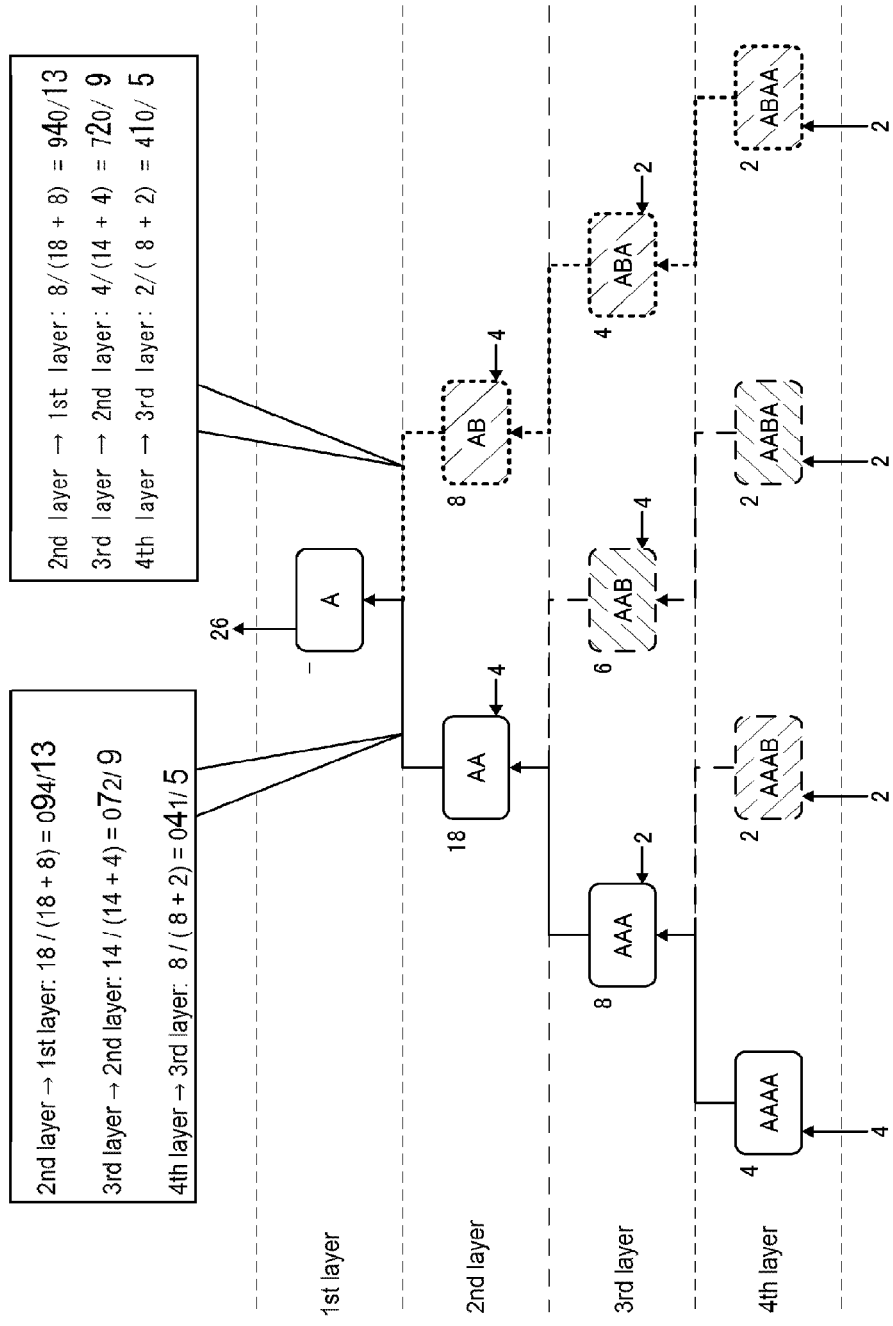
FIG. 20 is a schematic diagram used in describing a US wireless resource allocation procedure.
Figure 21:
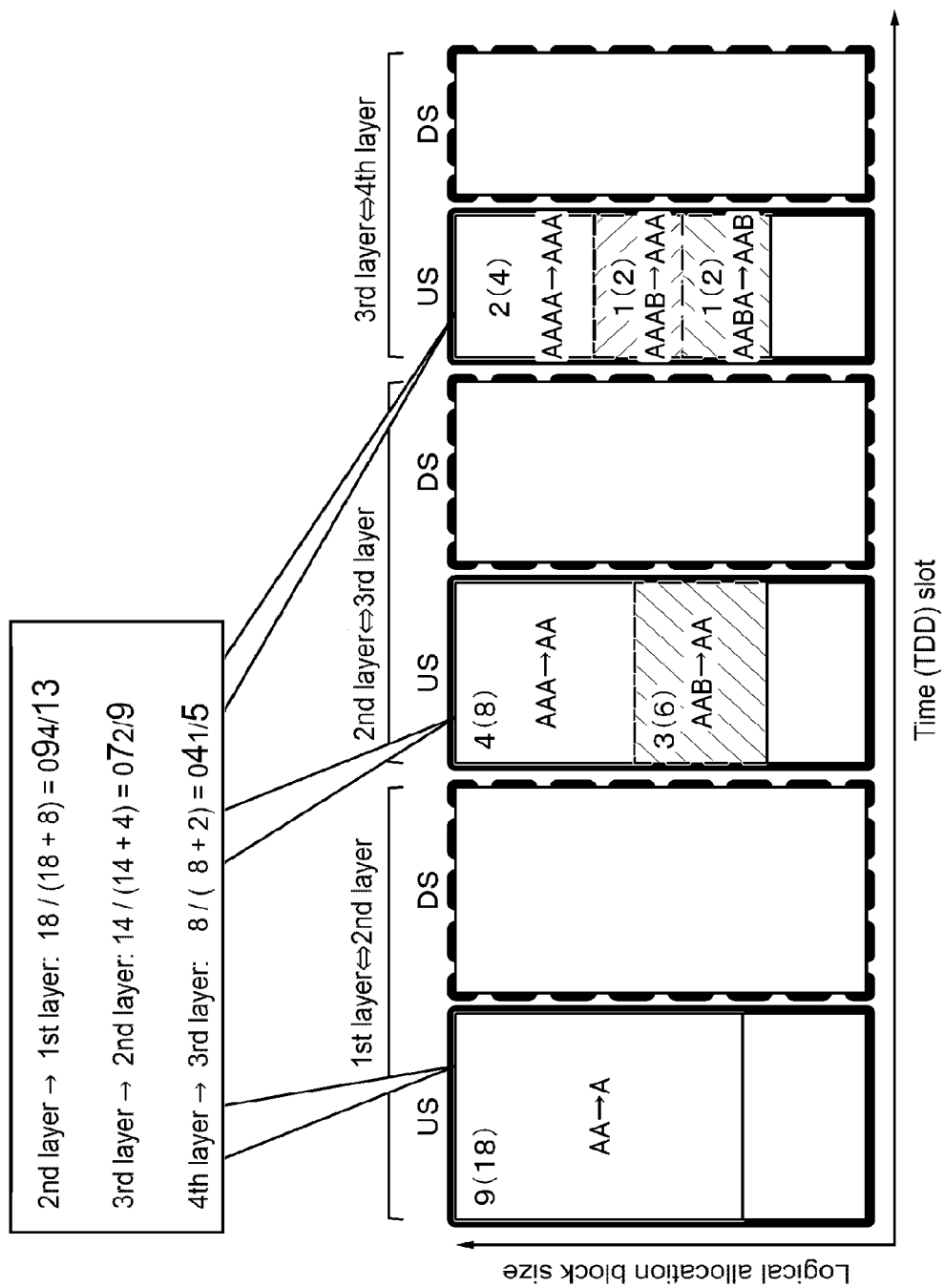
FIG. 21 is a schematic diagram used in describing a US wireless resource allocation procedure.
Figure 22:
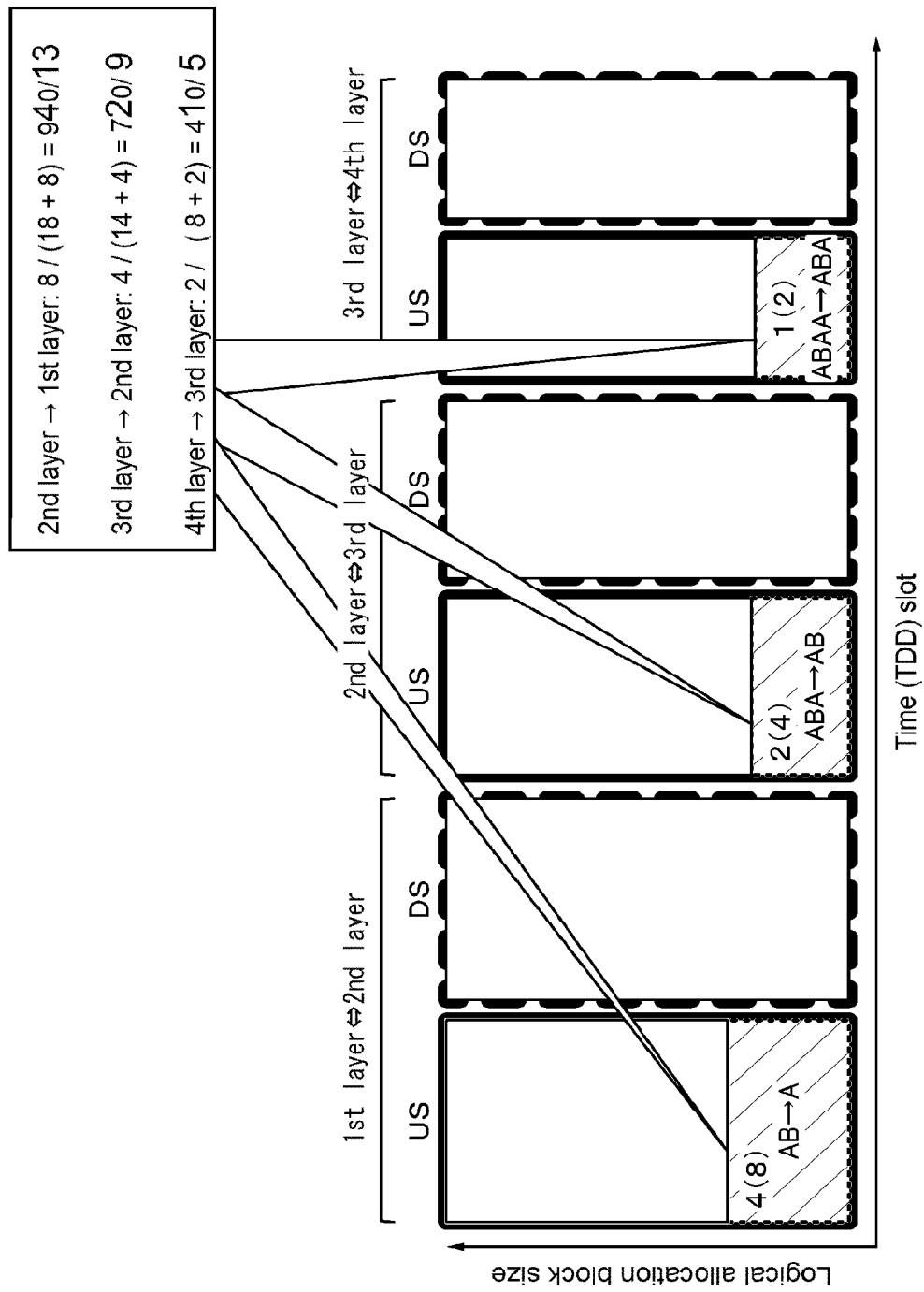
FIG. 22 is a schematic diagram used in describing a US wireless resource allocation procedure.

A root station or each sub-root station notifies its own child stations of frequency direction RB number ratios and permutations of US allocation wireless resources in layers of its sub-tree. FIG. 20 illustrates a specific example of RB number ratios and permutations to be notified. FIG. 21 and FIG. 22 sequentially illustrate processing of the notification.

"US Wireless Resource Allocation Procedure (2-2)"

Figure 23:
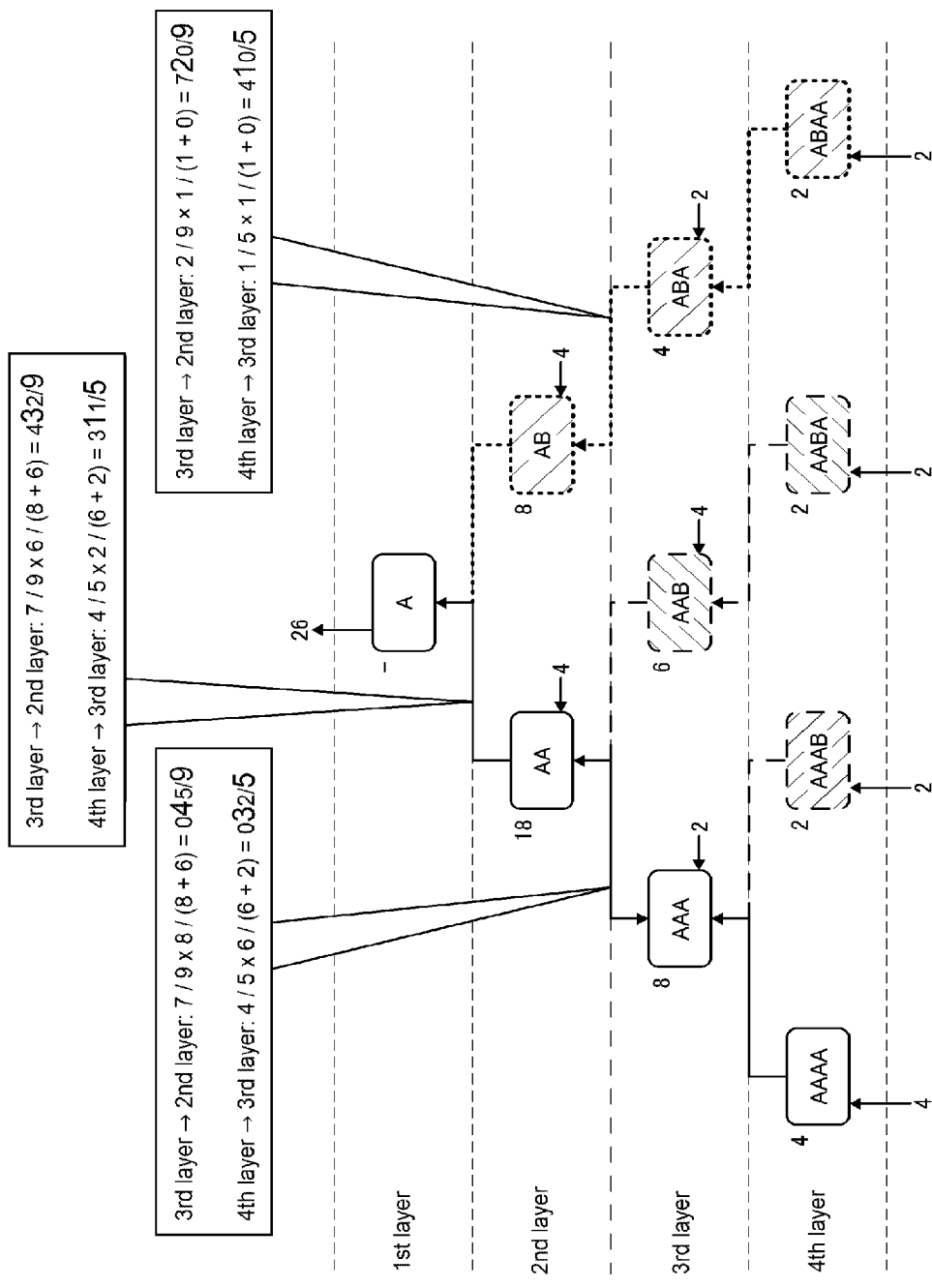
FIG. 23 is a schematic diagram used in describing a US wireless resource allocation procedure.
Figure 24:
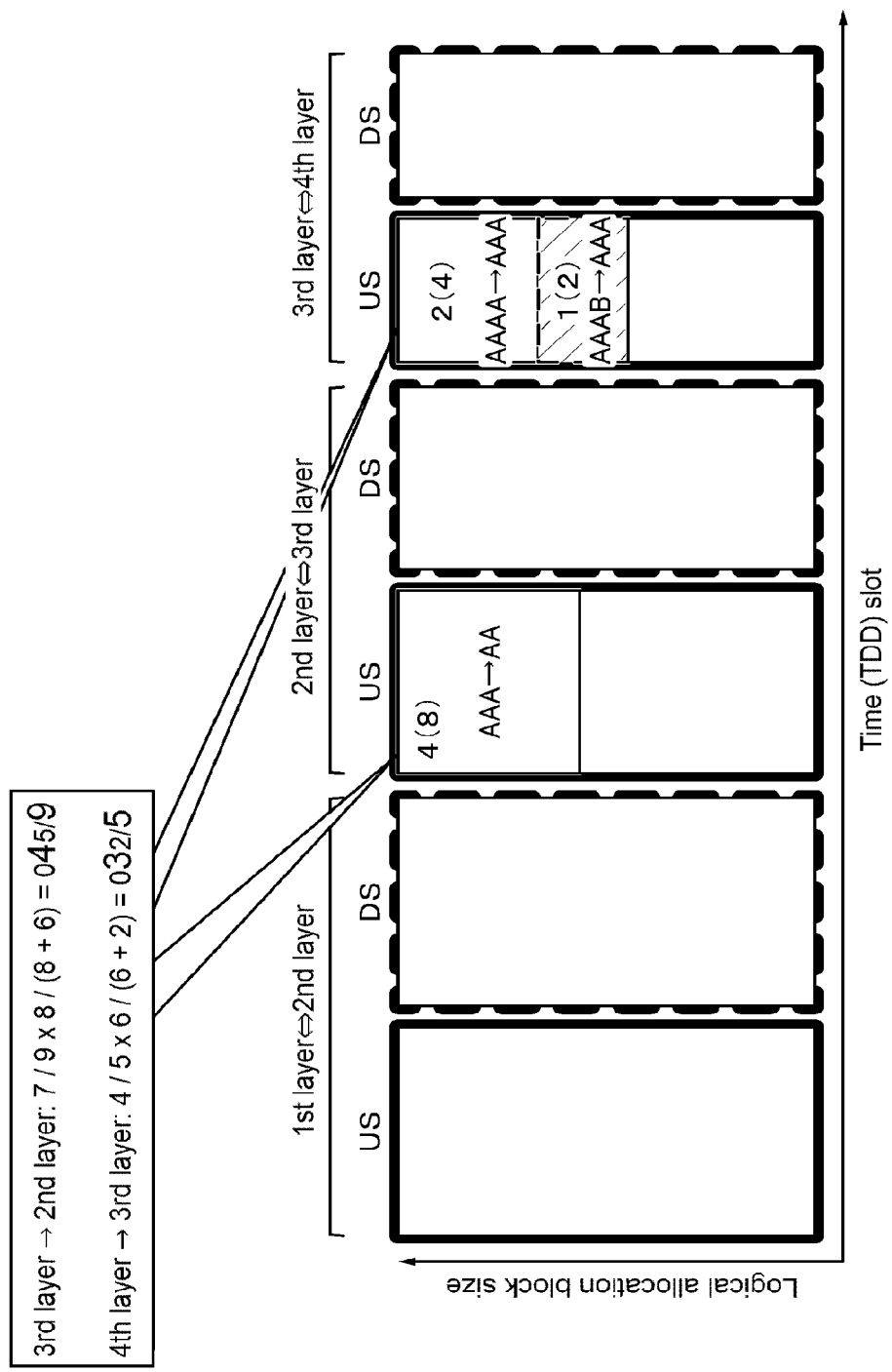
FIG. 24 is a schematic diagram used in describing a US wireless resource allocation procedure.
Figure 25:
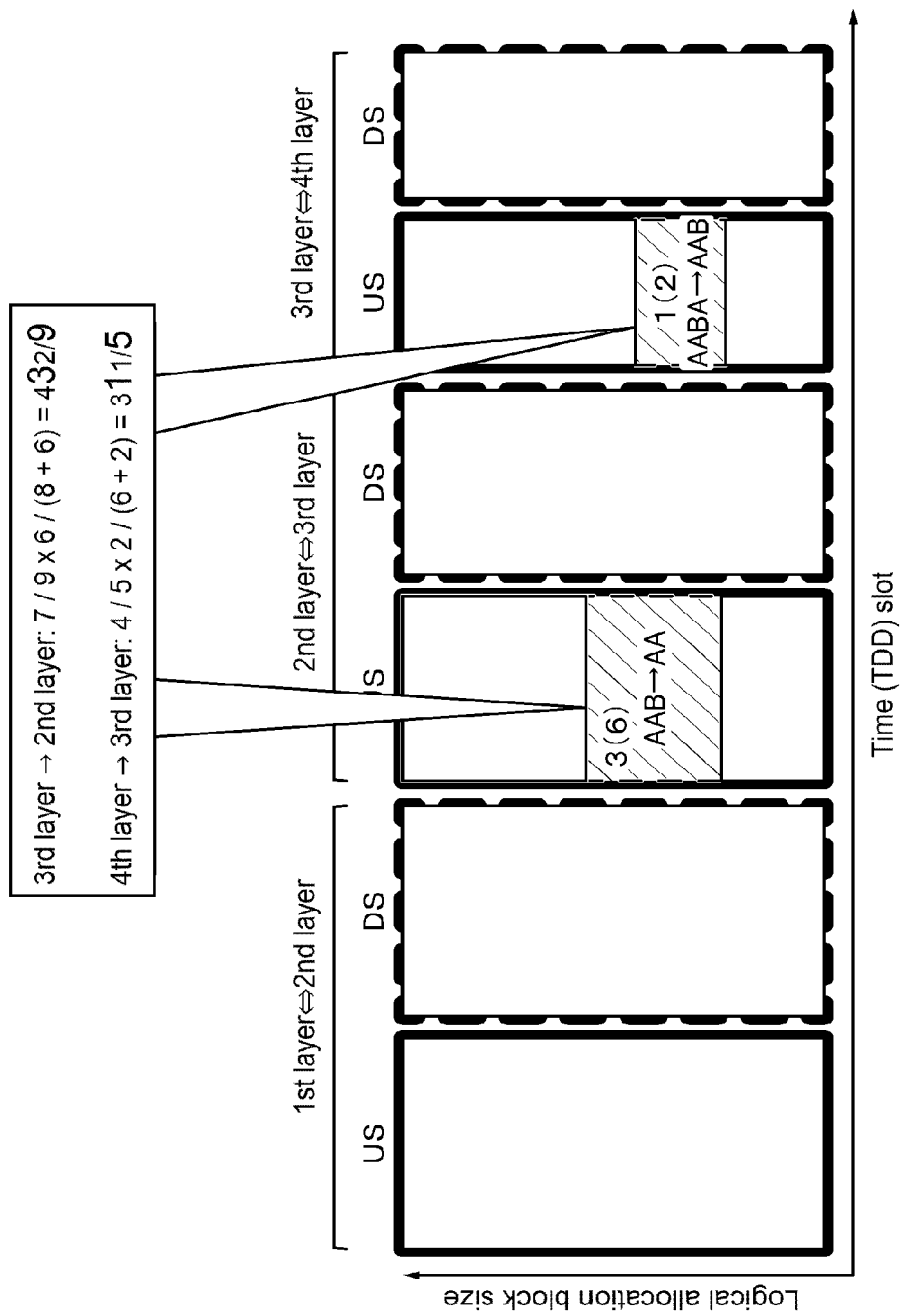
FIG. 25 is a schematic diagram used in describing a US wireless resource allocation procedure.
Figure 26:
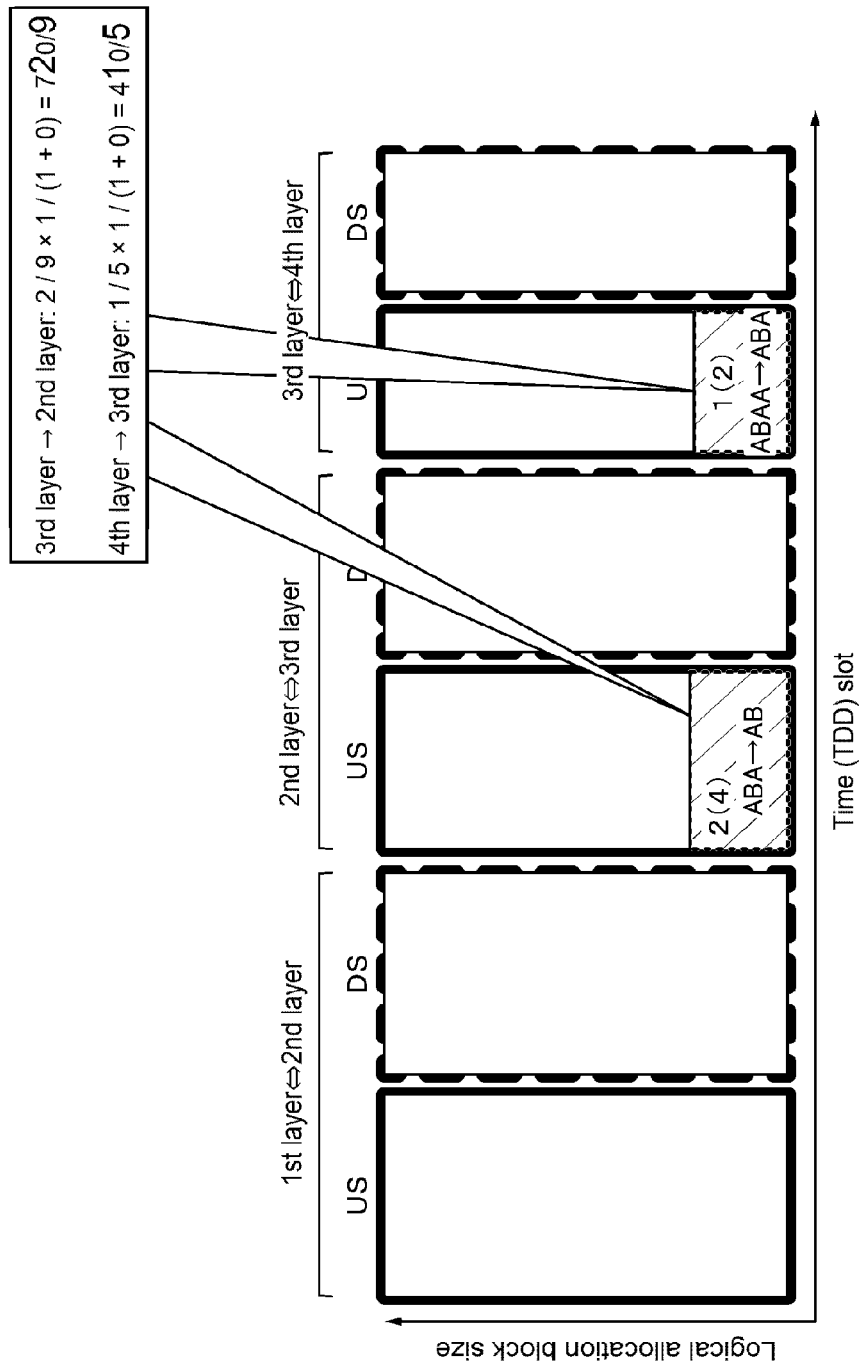
FIG. 26 is a schematic diagram used in describing a US wireless resource allocation procedure.

A root station or each sub-root station notifies its own child stations of frequency direction RB number ratios and permutations of US allocation wireless resources in layers of its sub-tree. FIG. 23 illustrates a specific example of RB number ratios and permutations to be notified. FIG. 24, FIG. 25 and FIG. 26 sequentially illustrate processing of the notification.

"US Wireless Resource Allocation Procedure (2-3)"

Figure 27:
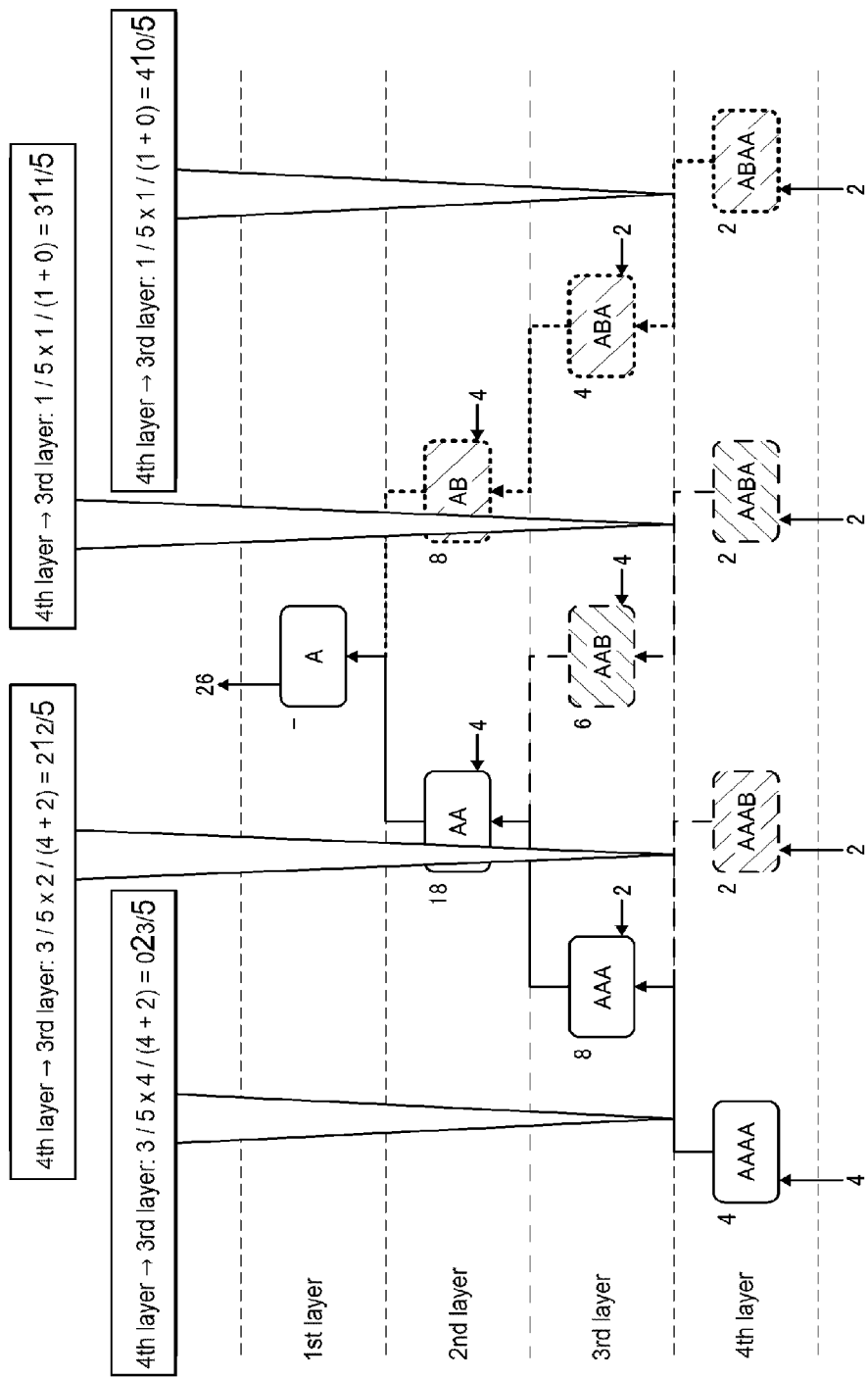
FIG. 27 is a schematic diagram used in describing a US wireless resource allocation procedure.
Figure 28:
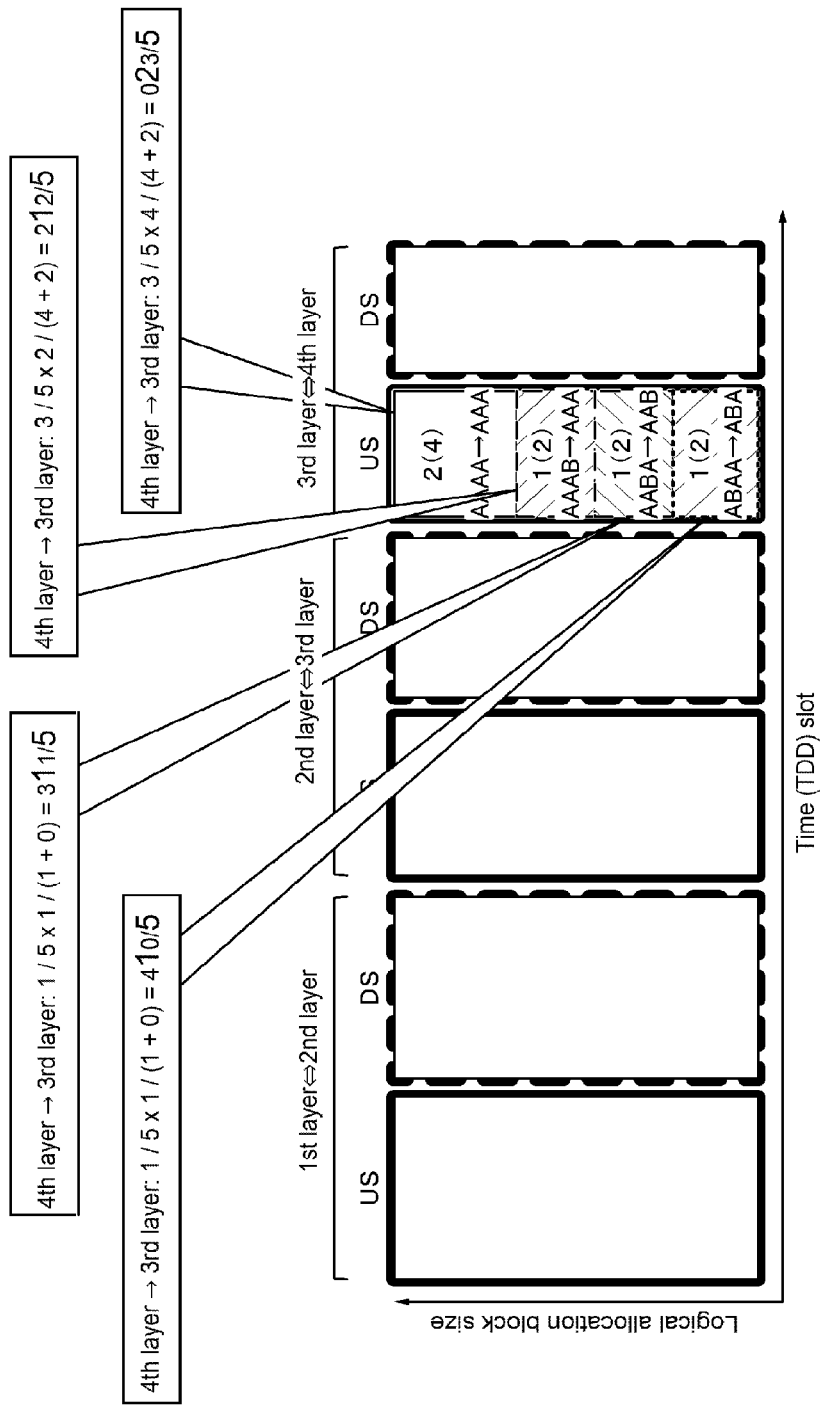
FIG. 28 is a schematic diagram used in describing a US wireless resource allocation procedure.

A root station or each sub-root station notifies its own child stations of frequency direction RB number ratios and permutations of US allocation wireless resources in layers of its sub-tree. FIG. 27 illustrates a specific example of RB number ratios and permutations to be notified. FIG. 28 sequentially illustrates processing of the notification.

"DS Wireless Resource Allocation Procedure (1)"

A collection base station obtains DS traffic volumes to each station.

"DS Wireless Resource Allocation Procedure (2-1)"

Figure 29:
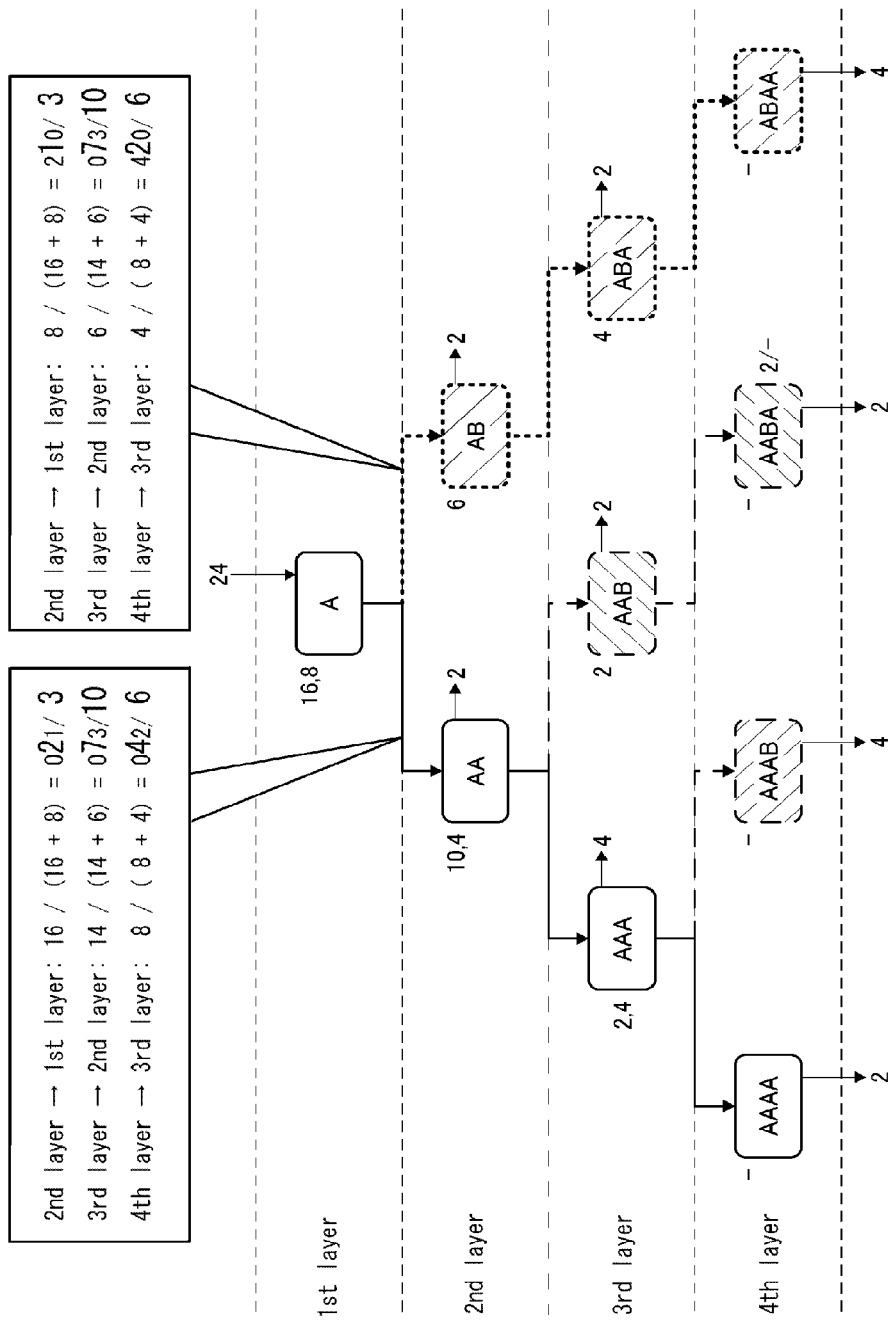
FIG. 29 is a schematic diagram used in describing a DS (Down Stream) wireless resource allocation procedure.
Figure 30:
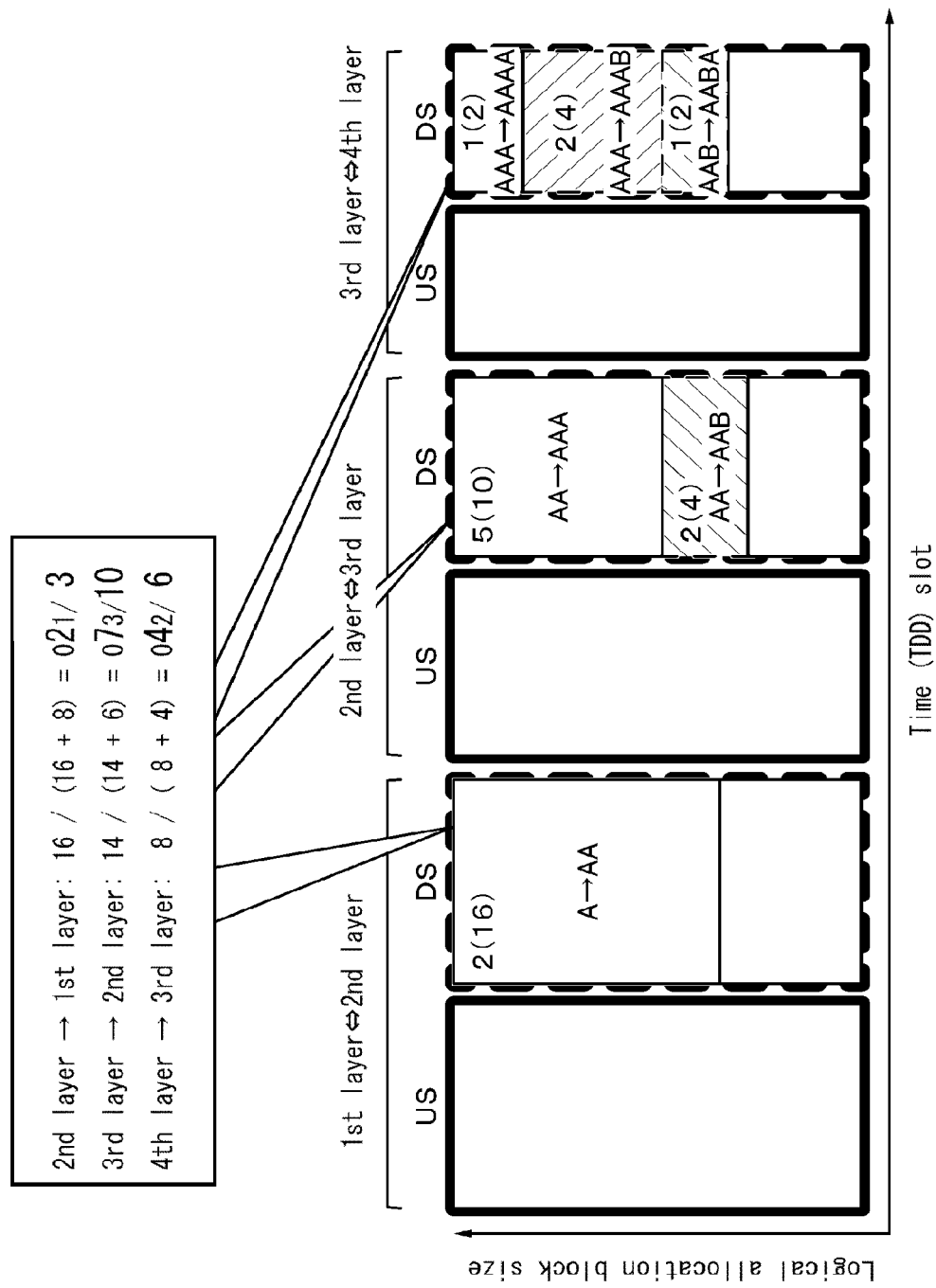
FIG. 30 is a schematic diagram used in describing a DS wireless resource allocation procedure.
Figure 31:
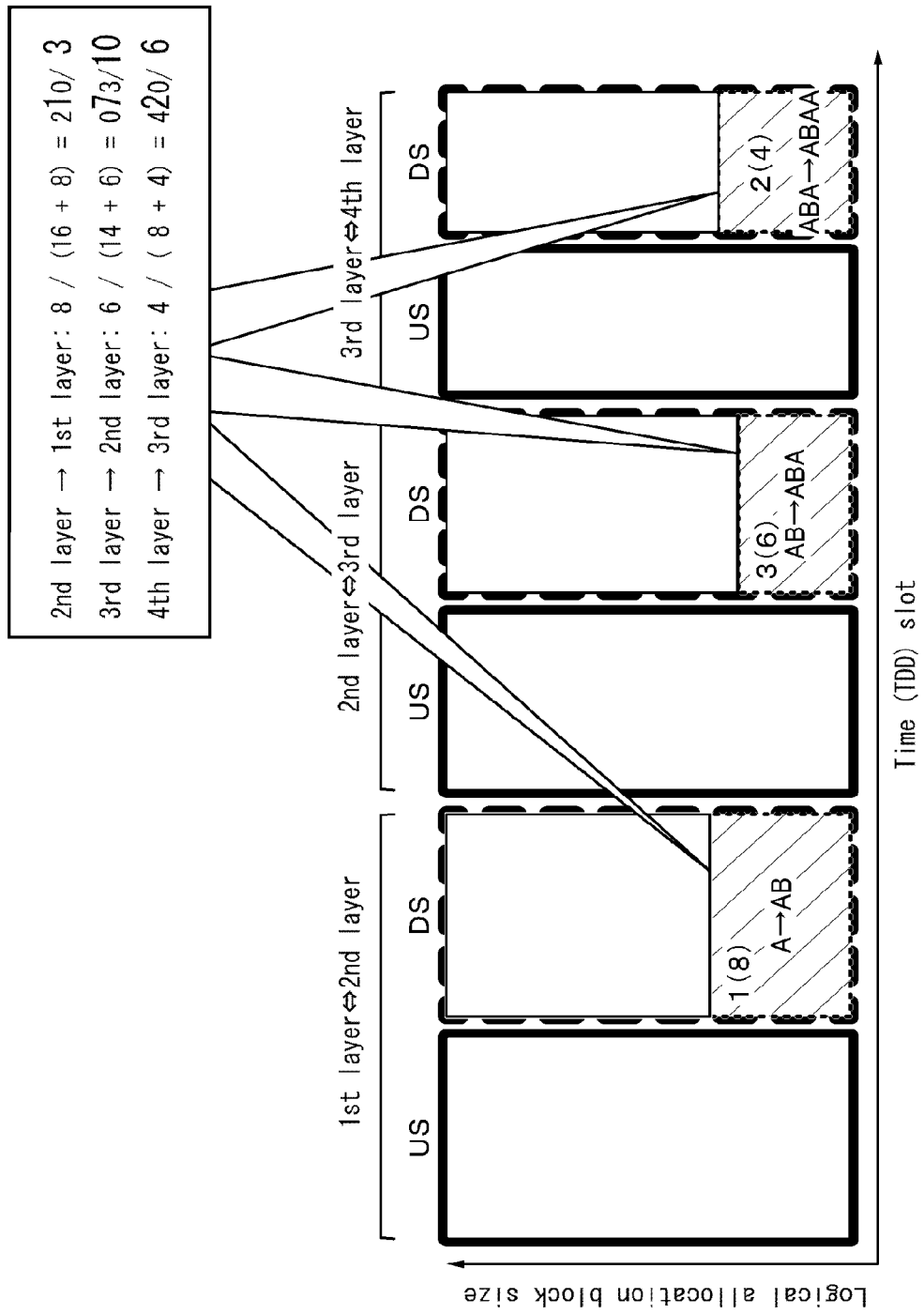
FIG. 31 is a schematic diagram used in describing a DS wireless resource allocation procedure.

A root station or each sub-root station notifies its own child stations of frequency direction RB number ratios and permutations of DS allocation wireless resources in layers of its sub-tree. FIG. 29 illustrates a specific example of RB number ratios and permutations to be notified. FIG. 30 and FIG. 31 sequentially illustrate processing of the notification.

"DS Wireless Resource Allocation Procedure (2-2)"

Figure 32:
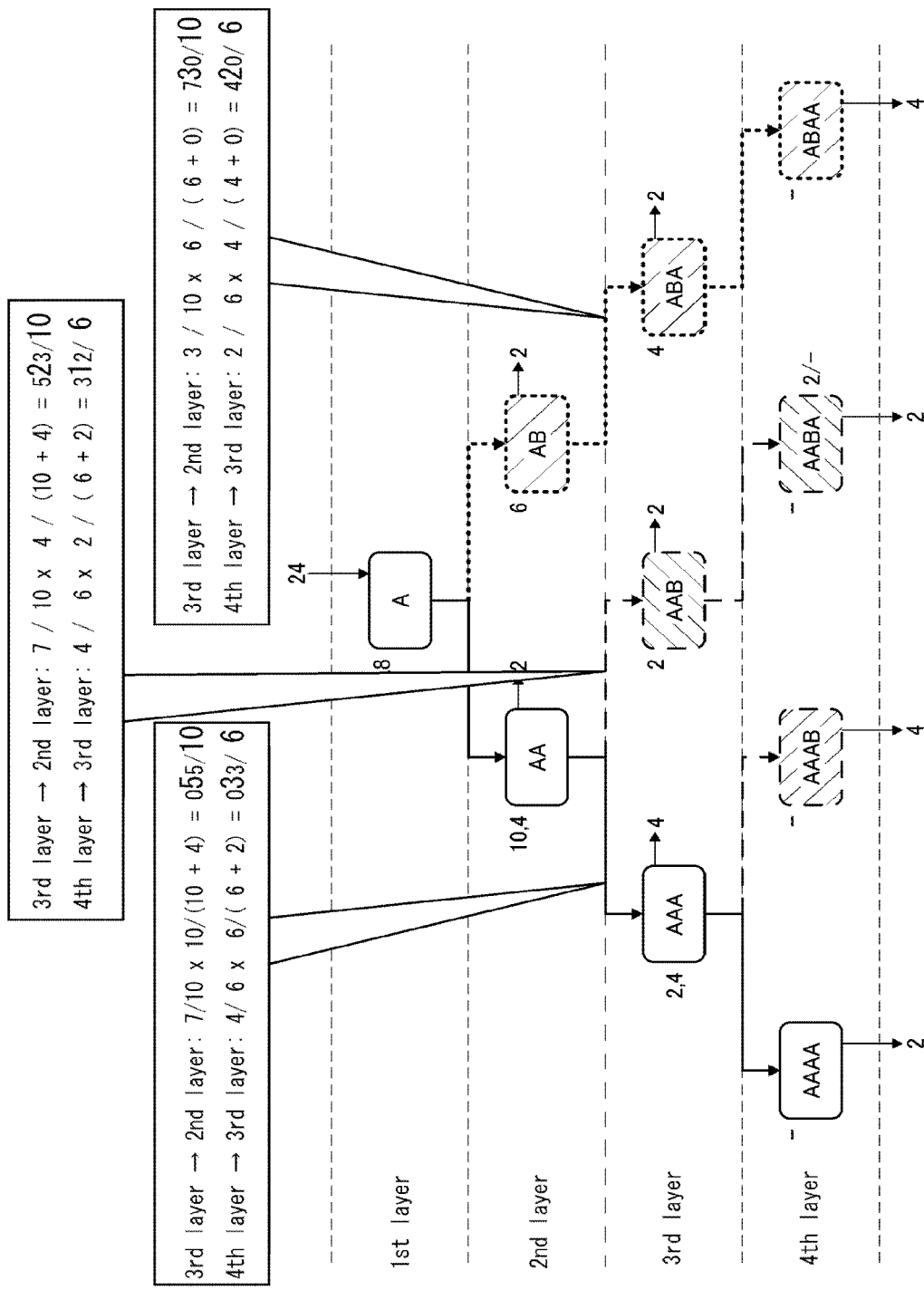
FIG. 32 is a schematic diagram used in describing a DS wireless resource allocation procedure.
Figure 33:
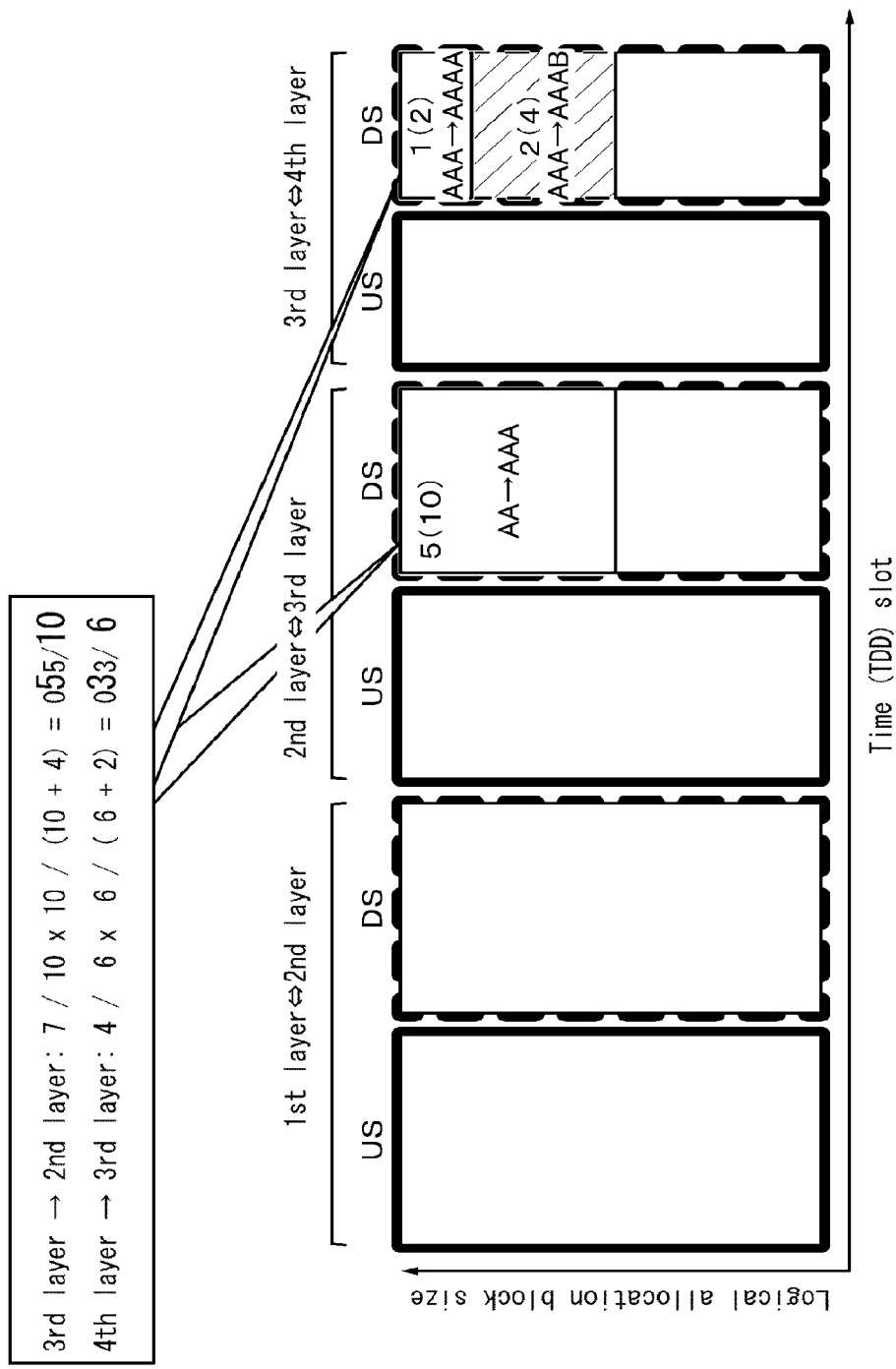
FIG. 33 is a schematic diagram used in describing a DS wireless resource allocation procedure.
Figure 34:
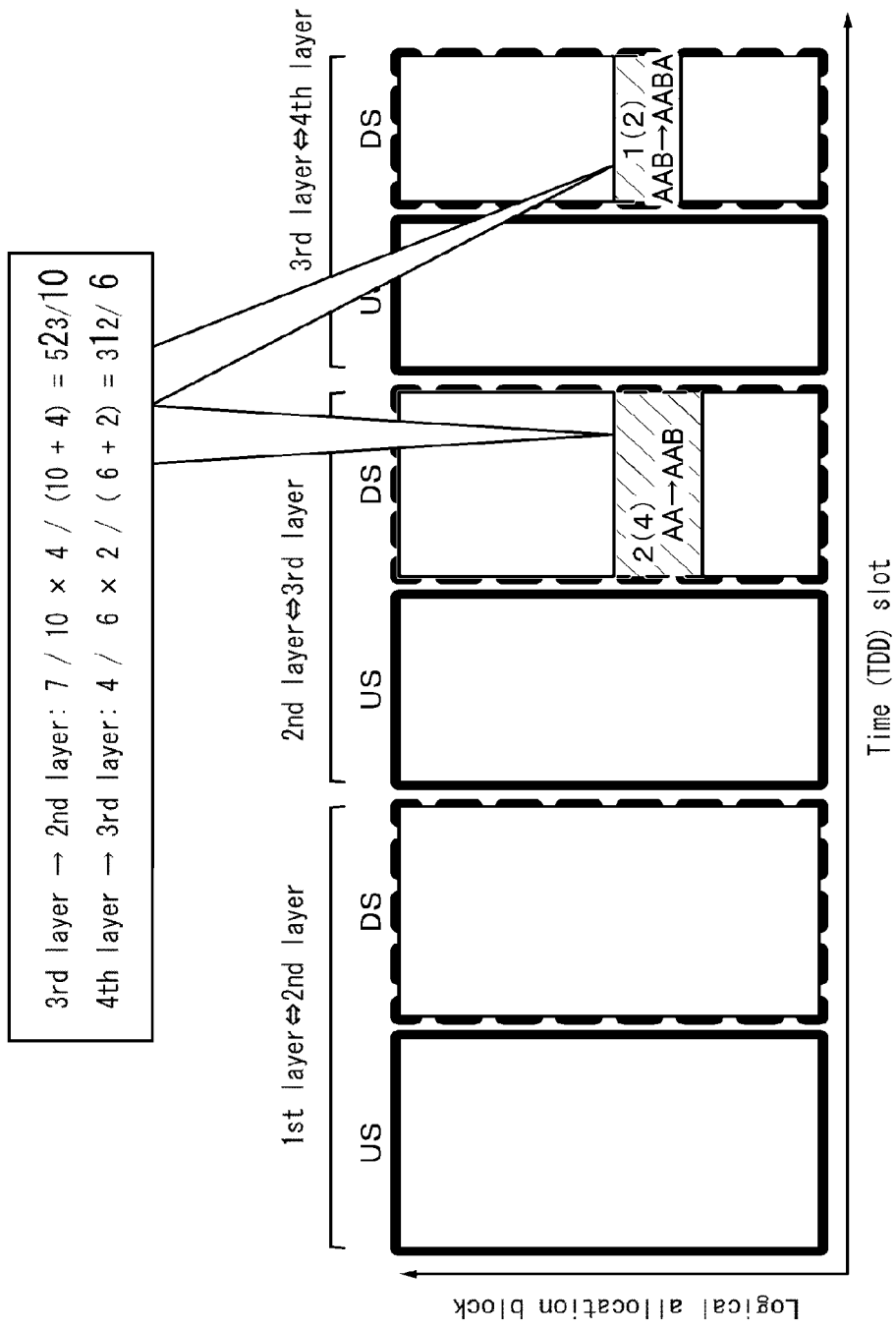
FIG. 34 is a schematic diagram used in describing a DS wireless resource allocation procedure.
Figure 35:
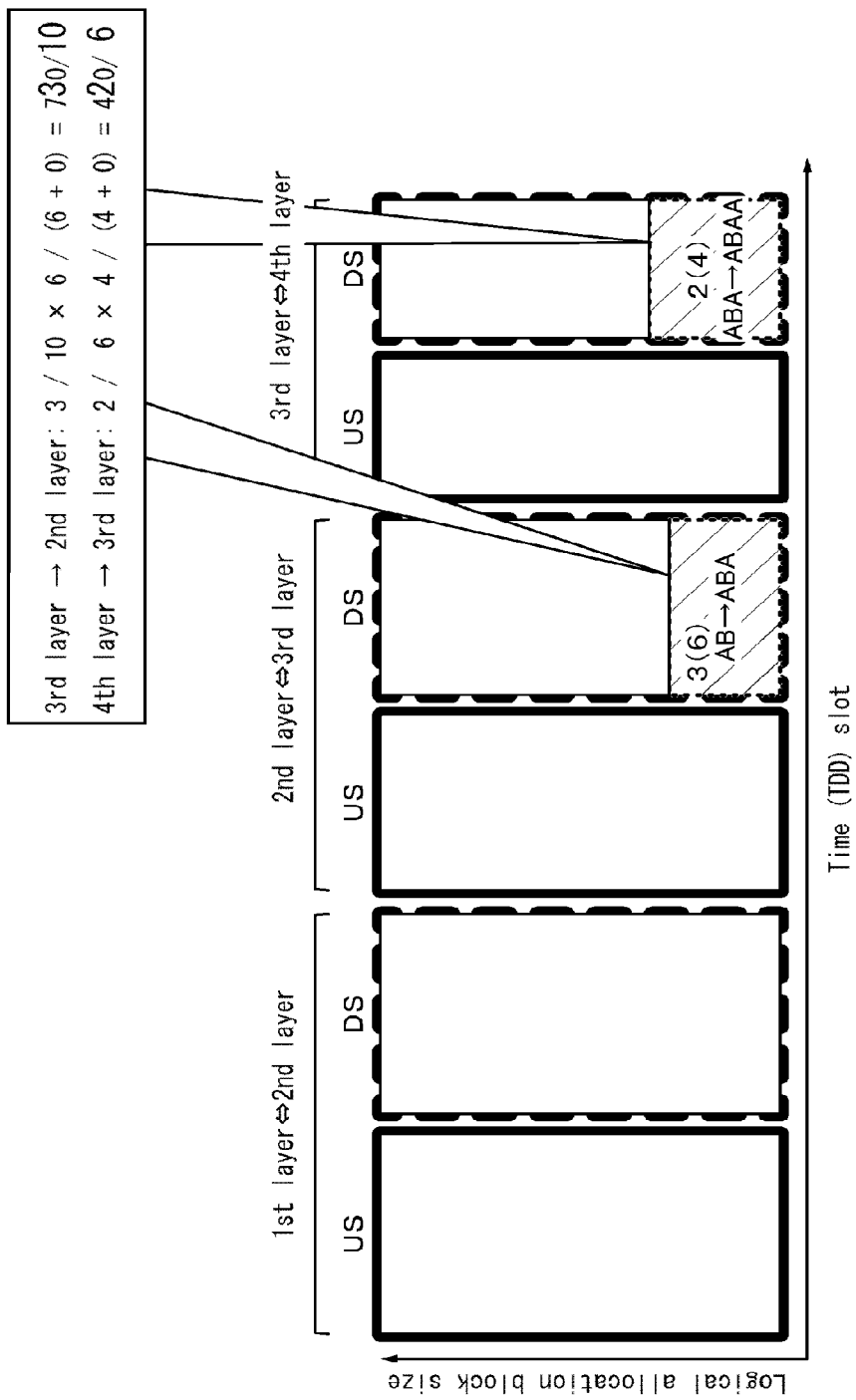
FIG. 35 is a schematic diagram used in describing a DS wireless resource allocation procedure.

A root station or each sub-root station notifies its own child stations of frequency direction RB number ratios and permutations of DS allocation wireless resources in layers of its sub-tree. FIG. 32 illustrates a specific example of RB number ratios and permutations to be notified. FIG. 33, FIG. 34 and FIG. 35 sequentially illustrate processing of the notification.

"DS Wireless Resource Allocation Procedure (2-3)"

Figure 36:
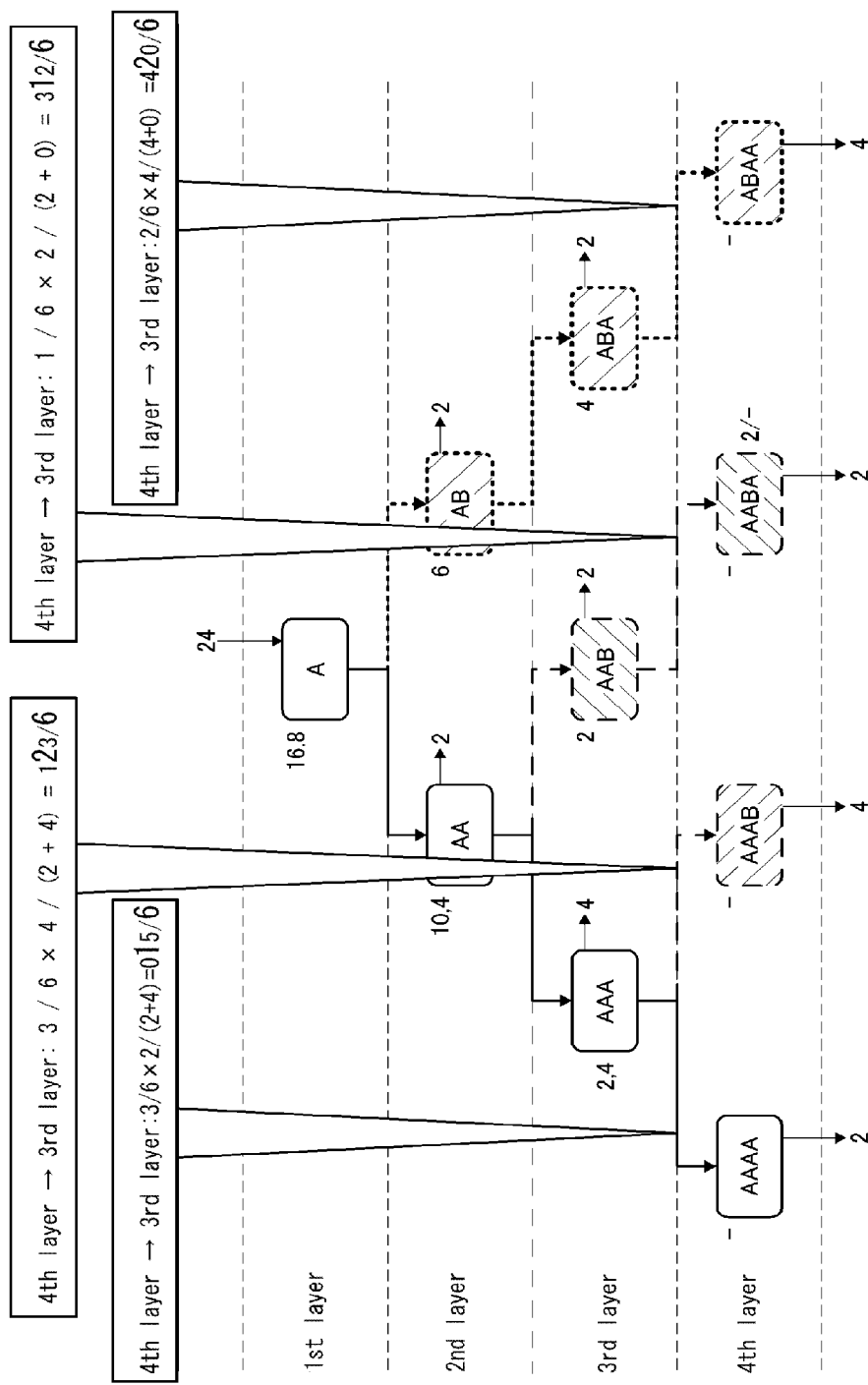
FIG. 36 is a schematic diagram used in describing a DS wireless resource allocation procedure.
Figure 37:
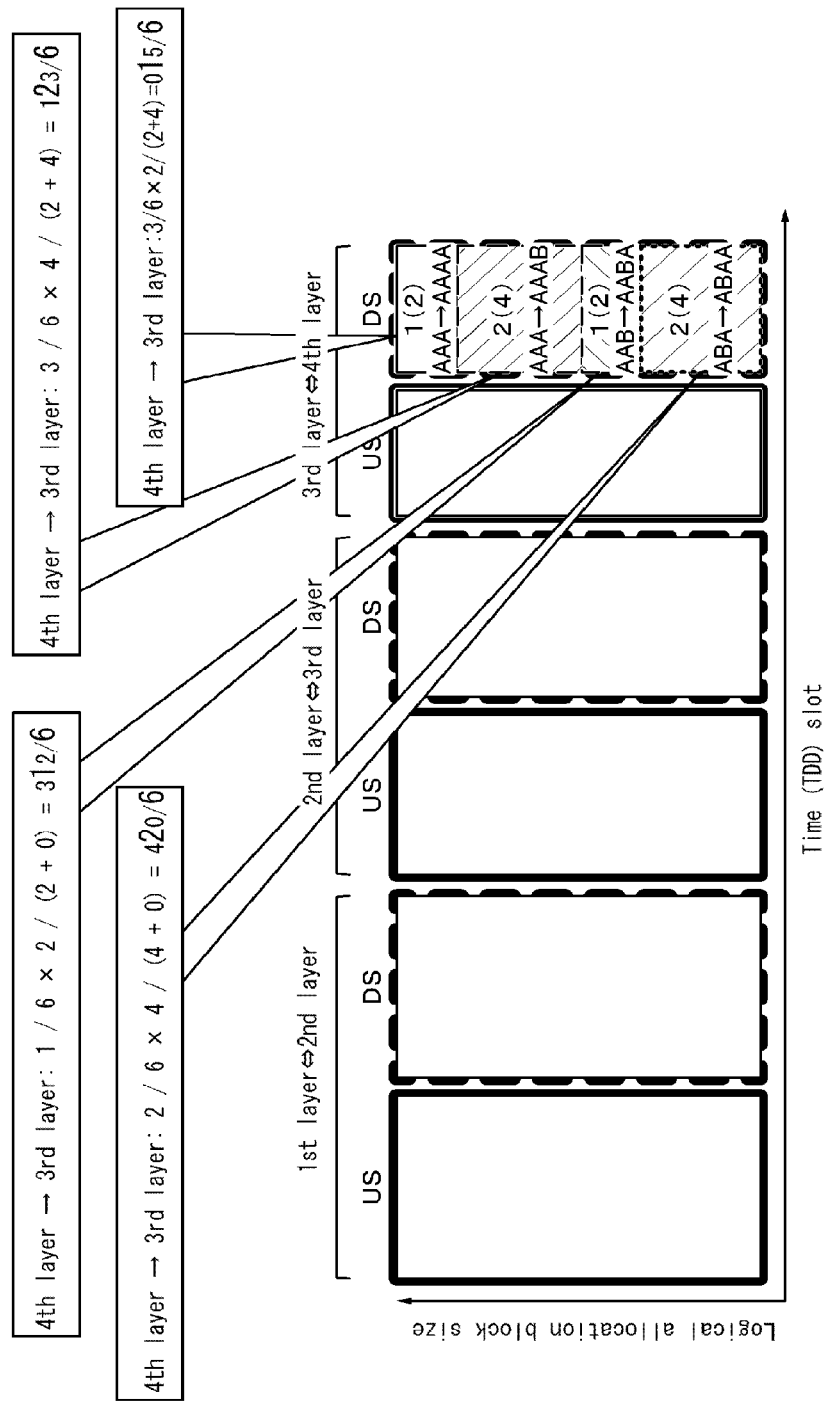
FIG. 37 is a schematic diagram used in describing a DS wireless resource allocation procedure.

A root station or each sub-root station notifies its own child stations of frequency direction RB number ratios and permutations of DS allocation wireless resources in layers of its sub-tree. FIG. 36 illustrates a specific example of RB number ratios and permutations to be notified. FIG. 37 sequentially illustrates processing of the notification.

"Description of Route Selection"

Route selection in an embodiment of the present invention is described below in more detail. "New entry" means that a station is newly added to the network. "Modulation scheme switching" is processing in which an MCS (modulation coding scheme) is changed according to a situation. "Route selection" is control in which a route is formulated based on an MCS such that an overall required wireless resource is reduced. Examples of selectable MCSs are shown in Table 2.

TABLE 2

| Modulation | Coding | Resource |
|---|---|---|
| QPSK | 1/2 | 2.00 |
| QPSK | 3/4 | 1.33 |
| 16QAM | 1/2 | 1.00 |
| 64QAM | 1/2 | 0.67 |
| 64QAM | 2/3 | 0.50 |
| 64QAM | 3/4 | 0.44 |

In an embodiment of the present invention, route selection control and wireless resource allocation control are repeatedly performed. When the two controls are compared to each other, as compared to a frequency at which the route selection control is performed, a frequency at which the wireless resource allocation control is performed is higher.

One of goals of the route selection is that each relay station performs multi-hop transmission and reception with a small amount of wireless resources and reduces a usage amount of wireless resource required in the entire network. That is, in order to increase a transmission amount per unit wireless resource, a route with a high transmission speed (a route with a small required wireless resource amount) is selected. Further, other goals are to reduce the number of hops and to improve controllability. Unless a required wireless resource amount is increased, a station (upper station) with a smaller number of hops to a collection base station is selected. In an embodiment of the present invention, there is a limit to the number of stations that can be connected. For example, the number of child stations that a station such as each RS can connect is 3 or less. A station to connect to is selected based on an amount of increase in load. The number of child stations that can be connected is limited because a large amount of data is communicated through a backbone line. The above connection limit of "3 stations" is merely an example, and a connection limit can be arbitrarily set.

"Route Selection Algorithm"

In the case of a new entry, it searches for a surrounding station, and connects to a discovered station.

In the case of route selection, an entire route is constructed based on information about stations that can be connected to and information about required wireless resource amounts between these stations. When a maximum number of connectable stations is exceeded in the constructed route, reconstruction is performed.

A flow of processing of a route selection algorithm is described below with reference to FIG. 38.

Step S61: Stations are arranged.

Step S62: A required wireless resource amount for unit data transmission between connectable stations is calculated.

Step S63: An E2E (End-to-End: a route connecting two parties) required wireless resource amount from a collection base station to each relay station is calculated.

Step S64: The smallest route for each relay station is selected.

Step S65: Whether or not there is a relay station to which 4 or more relay stations are connected is determined.

Step S66: When it is determined in Step 65 that the number of the relay stations is 4 or more, reconstruction is performed.

Step S67: When it is determined in Step S65 that the number of the relay station is less than 4, the route selection is completed. The threshold value (4) is an example, and other values may be used.

Figure 39:
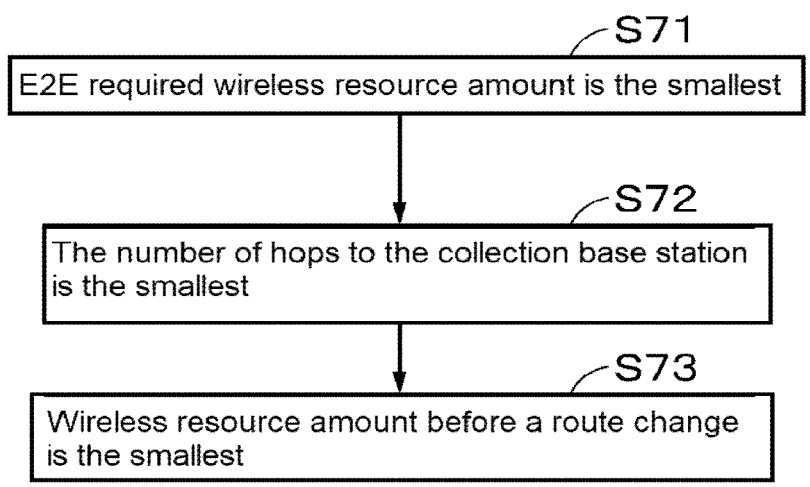
FIG. 39 is a schematic diagram used in describing a route selection algorithm.

The flowchart of FIG. 39 illustrates an order of priority when a connection destination is determined in Step S64.

Step S71: A route with a smaller E2E required wireless resource amount

Step S72: When the values are the same, a route with a smaller number hops to a collection base station Step S73: When a route still cannot be selected, a route with a smaller request wireless resource amount before a route change "Calculation Method of E2E Required Wireless Resource Amount"

A required wireless resource amount that is required when a unit packet passes through each link is calculated. The required wireless resource amount is a wireless resource amount that is required when a unit packet passes through the link. In the following example, a case is illustrated where the number of communication frames is considered as a wireless resource amount.

Figure 40:
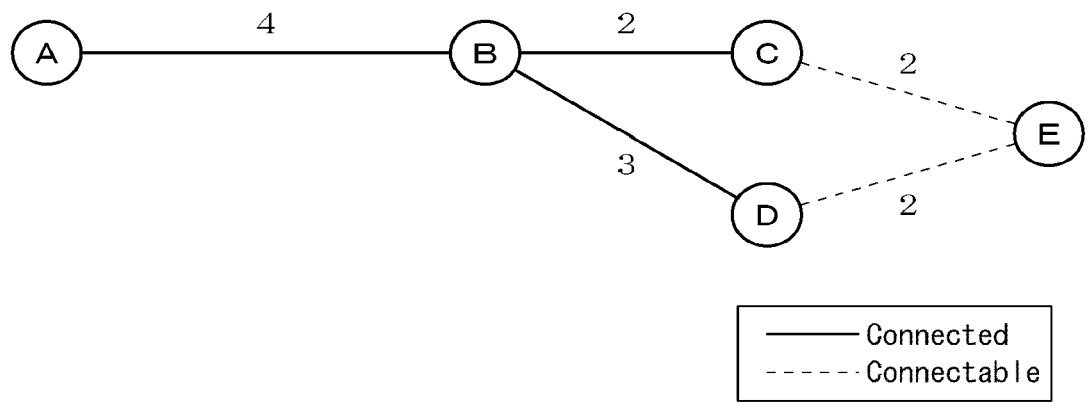
FIG. 40 is a schematic diagram used in describing a route selection algorithm.

In the example of FIG. 40, when Station C transmits to Station A, (Station C→Station B) requires 2 frames, (Station B→Station A) requires 4 frames, and a total of 6 frames are required.

When Station E joins the tree, links to Station C and Station D as parent station candidates are in the same layer; 2 frames are required both between Station E and Station C and between Station E and Station D; and a connection destination (parent station) cannot be determined.

Figure 41:
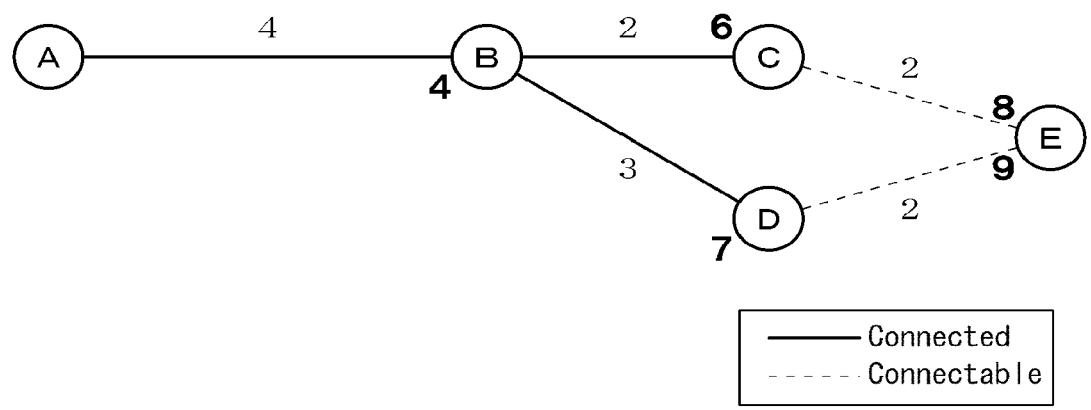
FIG. 41 is a schematic diagram used in describing a route selection algorithm.

As illustrated in FIG. 41, the required numbers of frames for each link are added. In FIG. 41, a number in bold represents a total number of frames from the corresponding station to Station A. Therefore, when Station E transmits to Station A via Station C, 8 frames are required (2+2+4=8), and when Station E transmits to Station A via Station D, 9 frames are required (2+3+4=9). Therefore, Station E determines that it is optimal when Station C with a smaller number of required frames is the parent.

Figure 42:
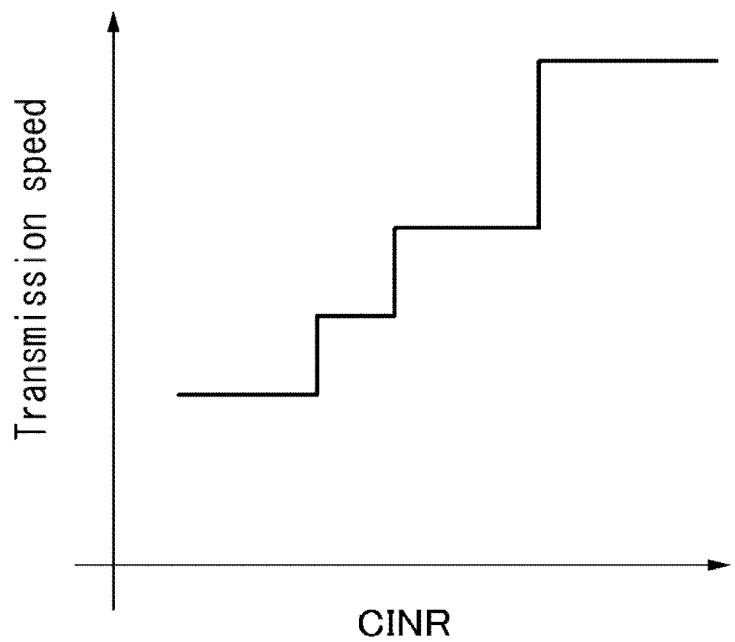
FIG. 42 is a schematic diagram used in describing a route selection algorithm.

An MCS (see Table 2 above) is determined from a CINR (Carrier to Interference and Noise Ratio). For example, an MCS is determined from an average value of CINRs. Dispersion may also be considered. Further, a value other than the average value may also be used. When an MCS is determined, a transmission speed can be calculated based on the MCS. FIG. 42 illustrates an example of a relationship between the CINR and the transmission speed. The transmission speed can also be calculated from the CINR. The number of required frames for unit data transmission calculated from transmission speed information is used in route selection. In addition to the CINR, other indicators of link quality such as RSSI (Received Signal Strength Indication/Indicator) may also be used.

A relationship between an MCS switching period and a route switching period is that the MCS switching period is smaller than the route switching period. MCS switching is allowed within the route switching period. It is not necessary to frequently perform MCS switching.

Figure 43:
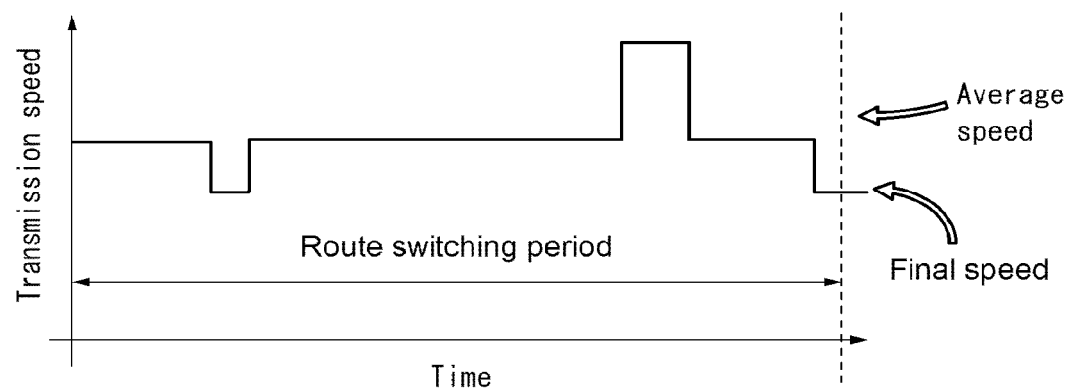
FIG. 43 is a schematic diagram used in describing a route selection algorithm.

Further, FIG. 43 illustrates an example of fluctuation in the transmission speed. Calculation of the number of required frames is described below with reference to FIG. 43. The number of frames is calculated based on a transmission speed for each route switching period. A higher transmission speed means a smaller number of required frames. Transmission speeds from a previous route switching timing to the present are considered. That is, the reason for this is that determination based only on the latest transmission speed is likely to be subject to instantaneous fluctuations. For example, the number of required frames is calculated from the average transmission speed and is used in route selection.

Rules of the reconstruction in the route selection algorithm are described below.

"Rule 1": When there is only one connectable parent station, connect to it with highest priority. This is because communication is impossible without the connection.

"Rule 2": Assuming that no child station candidate is connected, a station for which an increase in the number of required frames as compared to when being connected is the smallest is excluded from child station candidates.

Further, when a connecting station candidate is deleted, in the state of the deletion, the route selection flow is executed again.

Figure 44:
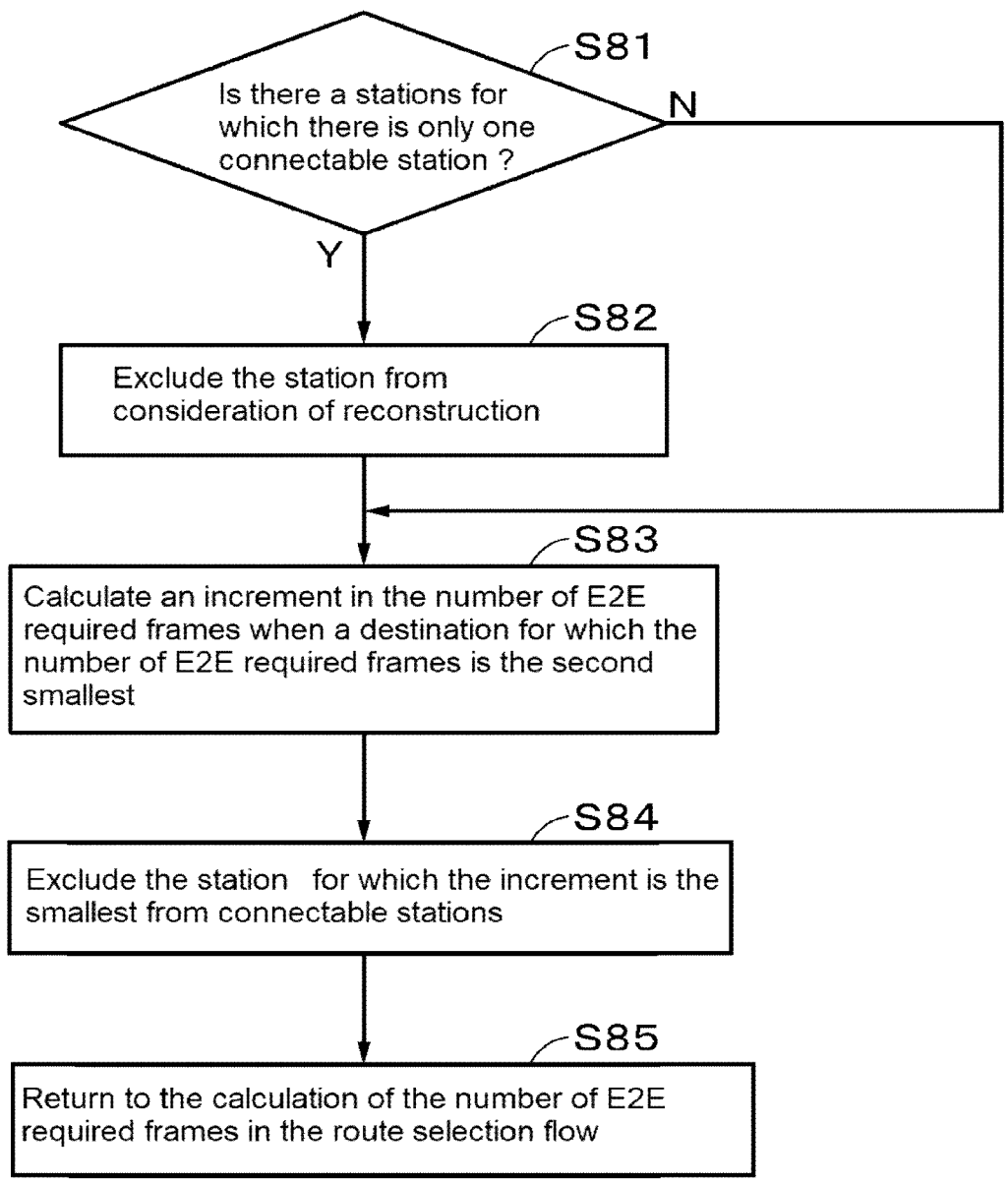
FIG. 44 is a flowchart used in describing a route selection algorithm.

Processing as illustrated in the flowchart of FIG. 44 is performed.

Step S81: Whether or not there is a station for which there is only one connectable station is determined.

Step S82: When a result of the determination of Step S81 is "Yes," the station is excluded from consideration of reconstruction.

Step S83: When a destination for which the number of required E2E frames is the second smallest is selected, an increment in the number of required E2E frames is calculated.

Step S84: A station for which the increment is the smallest is excluded from connectable stations.

Step S85: The processing returns to the calculation of the number of required E2E frames in the route selection flow.

"Operation Example of Route Selection Algorithm"

Figure 38:
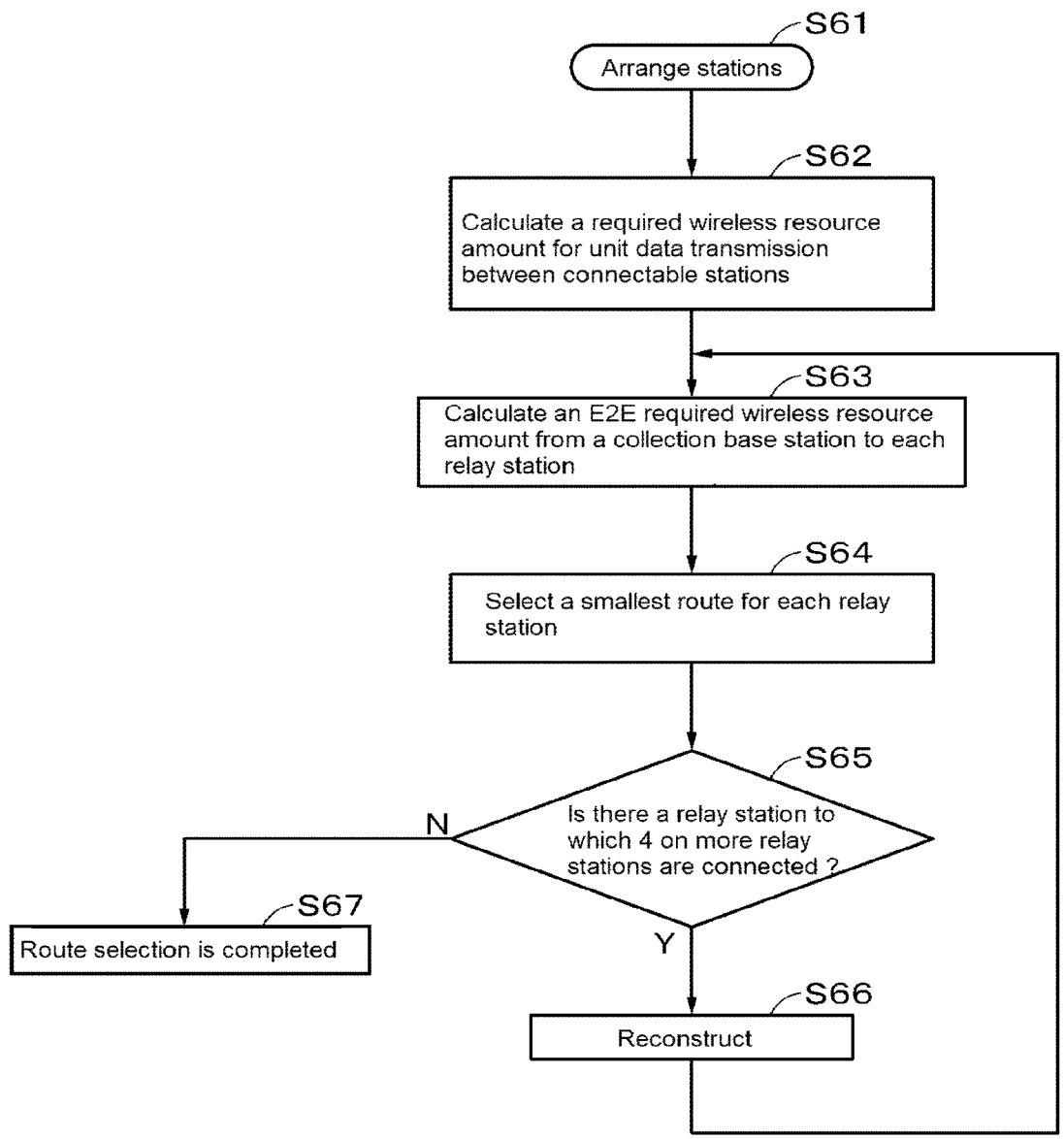
FIG. 38 is a schematic diagram used in describing a route selection algorithm.
Figure 45A:
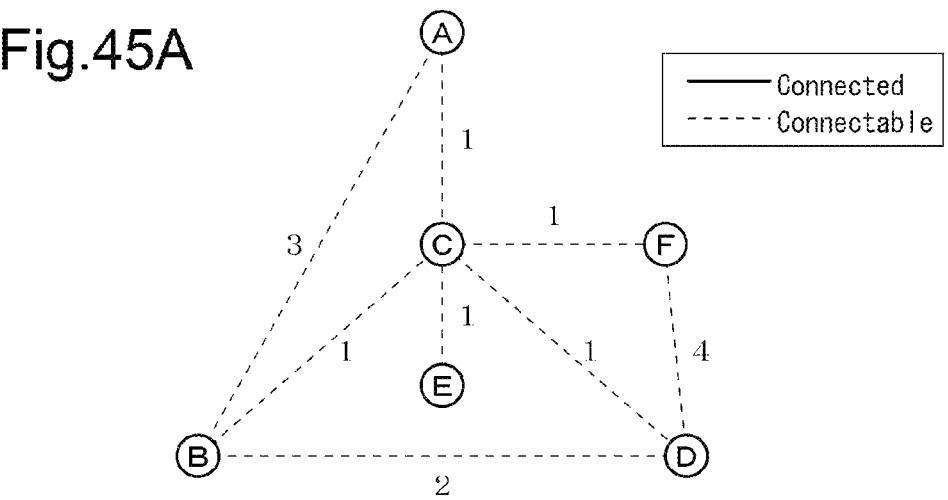
FIGS. 45A, 45B and 45C are schematic diagrams used in describing a route selection algorithm.

An operation example of the route selection algorithm illustrated in the flowchart of FIG. 38 is described below. Results of Step S62 (calculation of the number of required frames) in the flowchart are shown in FIG. 45A. In FIG. 45, a broken line represents a connectable path, and a solid line represents a connected path. A number added to a path in FIG. 45A represents the number of required frames per unit data in that path. Such notation also applies to other figures.

Figure 45B:
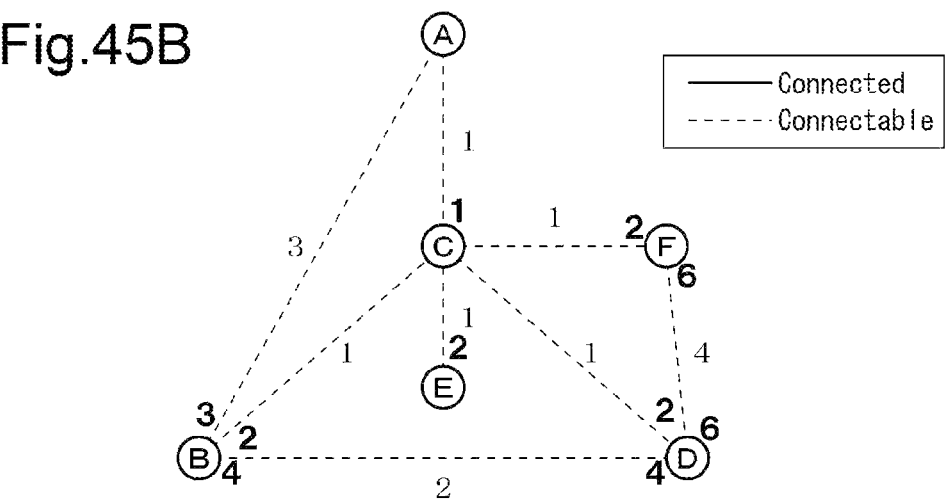

Processing results of Step S63 (calculation of the number of E2E frames from a collection base station to each relay station) are shown in FIG. 45B. Station A is the collection base station, and a number in bold represents the number of required frames per unit data to the collection base station. Such notation also applies to other figures.

Figure 45C:
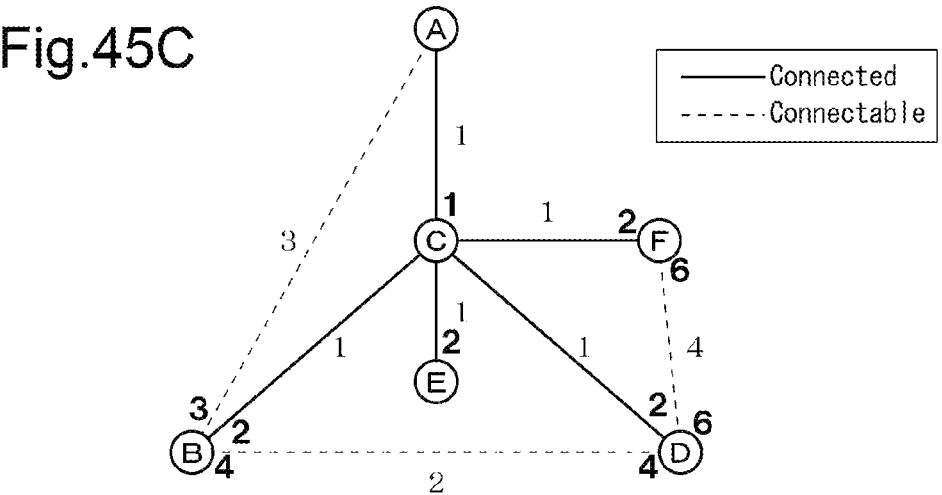

The route of FIG. 45C is formed by the processing of Step S64 (selection of the smallest route for each relay station).

Figure 46:
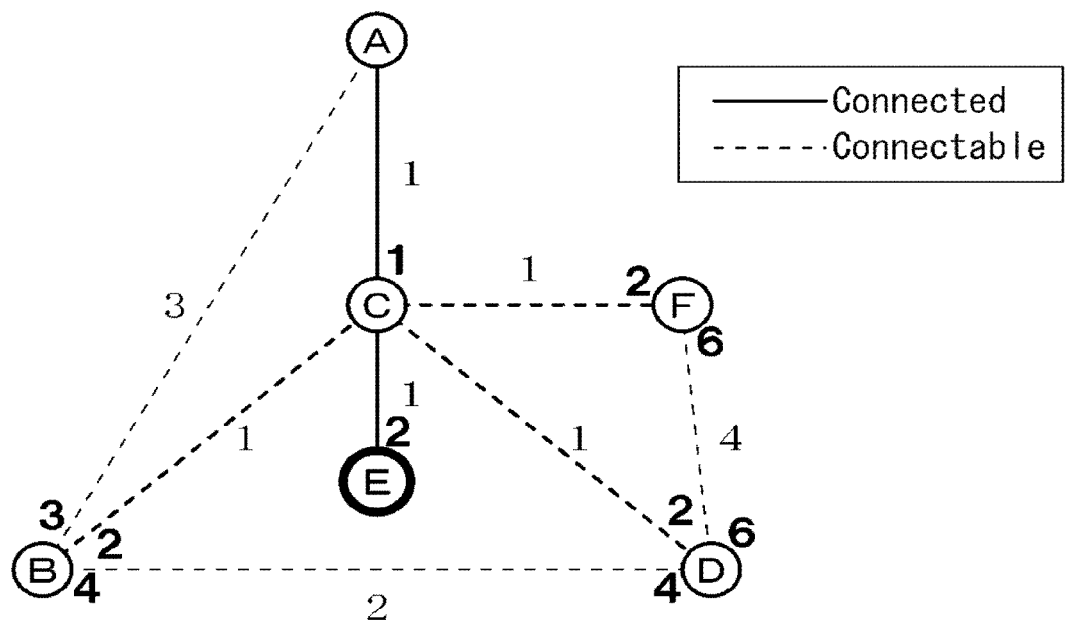
FIG. 46 is a schematic diagram used in describing a route selection algorithm.

An example of reconstruction is described below with reference to FIG. 46. "Rule 1" for reconstruction described above is applied. In the example of FIG. 46, according to "Rule 1," Station E can only have Station C as a parent. Station C connects Station E as a child station.

An example of reconstruction is described below with reference to FIG. 47. "Rule 2" for reconstruction described above is applied. "Rule 2" "assumes that no child station candidate is connected, and excludes from child station candidates a station for which an increase in load as compared to when being connected is the smallest." The "load" is "the number of required E2E frames to the collection base station." In the example in FIG. 47, when Station B is not connected to Station C, the number of required E2E frames to the collection base station changes from 2 to 3 (increase in the number of required frames: 1).

Figure 47:
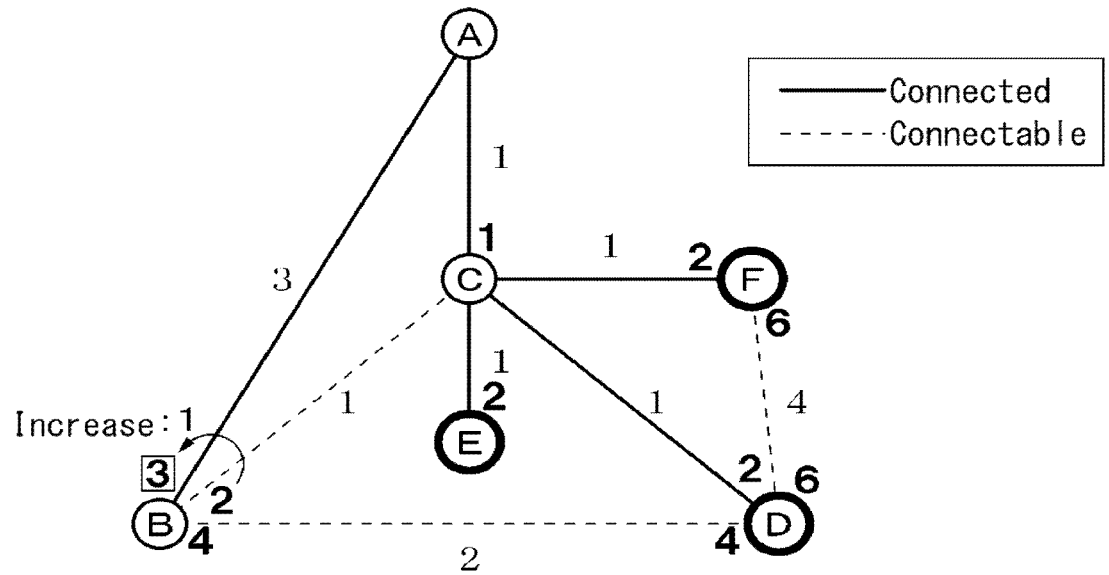
FIG. 47 is a schematic diagram used in describing a route selection algorithm.
Figure 48A:
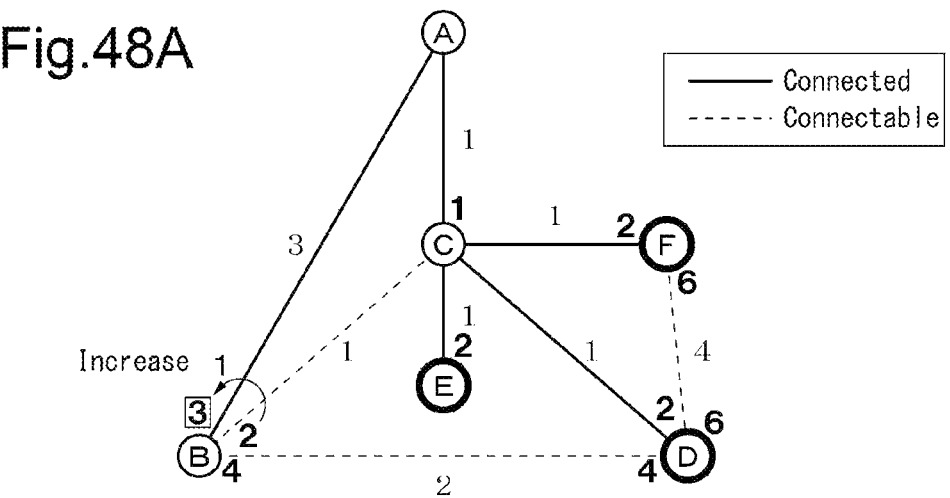
FIGS. 48A, 48B and 48C are schematic diagrams used in describing a route selection algorithm.
Figure 48B:
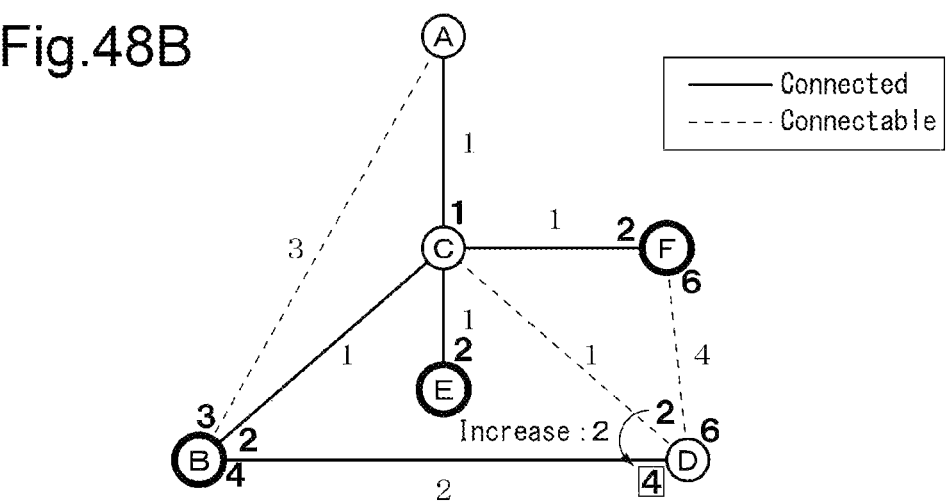
Figure 48C:
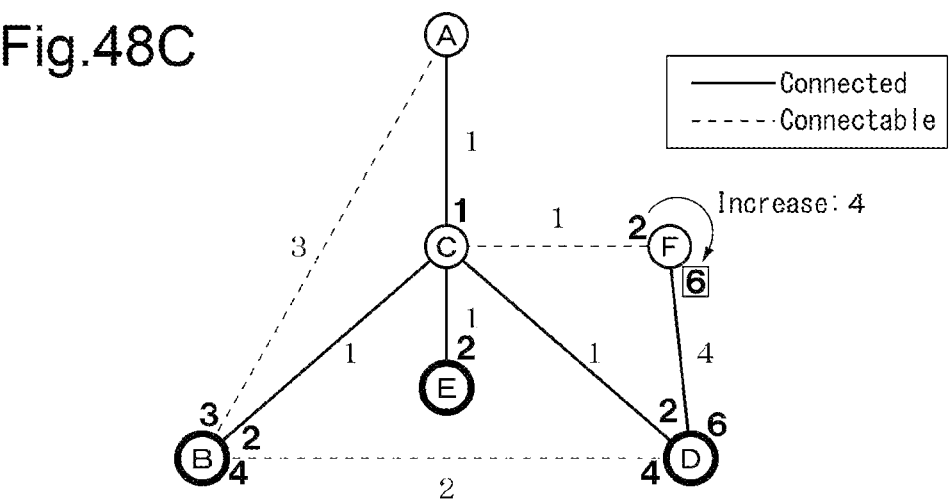

Similar to FIG. 47, FIG. 48A shows the increase in the number of required frames when Station B is excluded. FIG. 48B shows that the increase in the number of required frames is "2" when Station D is excluded. FIG. 48C shows that the increase in the number of required frames is "4" when Station F is excluded. Therefore, in the example of FIG. 47 and FIG. 48, it is optimal when Station B is excluded from the child station candidates.

2. Modified Embodiments

In the above, the embodiments of the present invention are specifically described. However, the present invention is not limited to the above-described embodiments, and various modifications based on the technical ideas of the present invention are possible. Further, the structures, methods, processes, shapes, materials, numerical values or the like of the embodiments described above can be combined with each other without departing from the spirit of the present invention.

DESCRIPTION OF REFERENCE NUMERALS

10: collection base station,
11: wireless processing part,
21: scheduler server,
22: wireless resource request amount collection analysis part,
23: wireless resource allocation calculation part,
24: link quality information collection analysis part,
25: optimal relay route calculation part,
30: relay station,
31: wireless processing part,
41: relay control part,
42: wireless resource allocation part,
44: route switching part,
45: link quality sensing part

The invention claimed is:

1. A communication device wherein
a wireless network is formed of at least one sub-tree including a sub-root station,
the sub-root station collects request wireless resource allocation information which a child station included in the sub-tree has, and receives information obtained by adding request wireless resource allocation information of the sub-root station itself to the collected request wireless resource allocation information, and
the sub-root station is notified of wireless resource information available in the entire sub-tree.

2. The communication device according to claim 1, wherein, when the sub-root station does not have a child station, the sub-root station receives the request wireless resource allocation information of the sub-root station itself.

3. The communication device according to claim 1, wherein the sub-tree is formed of multiple layers.

4. The communication device according to claim 1, wherein wireless resource allocated to each link is divided and allocated in a time direction.

5. The communication device according to claim 1, wherein wireless resources allocated to links in the same layer are divided and allocated in a frequency direction, and wireless resources allocated to links in different layers are divided and allocated in a time direction.

6. The communication device according to claim 1, wherein wireless resource allocation amount is varied between an upstream and a downstream depending on a system used.

7. The communication device according to claim 1, wherein, when there is a new entry station, the sub-root station performs wireless resource allocation for the new entry station.

8. The communication device according to claim 1, wherein
a required wireless resource amount for unit data transmission between connectable stations is calculated,
a required E2E wireless resource amount between a collection base station and each relay station is calculated, and
a route for which the required wireless resource amount determined is the smallest is selected.

9. The communication device according to claim 1, wherein, when the number of connectable stations exceeds an upper limit in a constructed route, reconstruction is performed.

10. The communication device according to claim 1, wherein, when there are multiple routes for which the required wireless resource amount is the smallest, a route for which the number of hops is the smallest is selected.

11. The communication device according to claim 1, wherein, when a route for which the number of hops is the smallest cannot be selected, a route for which a required wireless resource amount before a route change is the smallest is selected.

12. The communication device wherein wireless resource received from the communication device according to claim 1 as wireless resource for the sub-tree is allocated as wireless resource allocated to the sub-root station and wireless resource allocated to a child station using absolute value information or ratio information of a request wireless resource amount collected by the sub-root station.

13. A communication system wherein
a wireless network is formed of at least one sub-tree including a sub-root station,
the sub-root station collects request wireless resource allocation information which a child station included in the sub-tree has, and receives information obtained by adding request wireless resource allocation information of the sub-root station itself to the collected request wireless resource allocation information, and
the sub-root station is notified of wireless resource information available in the entire sub-tree.

14. The communication system according to claim 13, wherein, when the sub-root station does not have a child station, the sub-root station receives the request wireless resource allocation information of the sub-root station itself.

15. The communication system according to claim 13, wherein the sub-tree is formed of multiple layers.

16. The communication system according to claim 13, wherein wireless resource allocated to each link is divided and allocated in a time direction.

17. The communication system according to claim 13, wherein wireless resources allocated to links in the same layer are divided and allocated in a frequency direction, and wireless resources allocated to links in different layers are divided and allocated in a time direction.

18. The communication system according to claim 13, wherein wireless resource allocation amount is varied between an upstream and a downstream depending on a system used.

19. The communication system according to claim 13, wherein, when there is a new entry station, the sub-root station performs wireless resource allocation for the new entry station.

20. The communication system according to claim 13, wherein
a required wireless resource amount for unit data transmission between connectable stations is calculated,
a required E2E wireless resource amount between a collection base station and each relay station is calculated, and
a route for which the required wireless resource amount determined is the smallest is selected.

* * * * *